(12) United States Patent
Kaizu

(10) Patent No.: US 11,297,252 B2
(45) Date of Patent: Apr. 5, 2022

(54) SIGNAL PROCESSING APPARATUS AND SIGNAL PROCESSING METHOD, AND IMAGING DEVICE

(71) Applicant: SONY CORPORATION, Tokyo (JP)

(72) Inventor: Shun Kaizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/056,335

(22) PCT Filed: Feb. 13, 2019

(86) PCT No.: PCT/JP2019/005039
§ 371 (c)(1),
(2) Date: Nov. 17, 2020

(87) PCT Pub. No.: WO2019/225071
PCT Pub. Date: Nov. 28, 2019

(65) Prior Publication Data
US 2021/0227116 A1    Jul. 22, 2021

(30) Foreign Application Priority Data

May 23, 2018  (JP) .............................. JP2018-098567

(51) Int. Cl.
*H04N 5/235*  (2006.01)
(52) U.S. Cl.
CPC ......... *H04N 5/2352* (2013.01); *H04N 5/2357* (2013.01)
(58) Field of Classification Search
CPC .... H04N 5/2352; H04N 5/2357; H04N 5/225; H04N 5/235; H04N 5/353
See application file for complete search history.

(56) References Cited

U.S. PATENT DOCUMENTS

| 2013/0051700 A1 | 2/2013 | Jo |
| 2015/0028189 A1 | 1/2015 | Hagiwara et al. |
| 2018/0124335 A1 | 5/2018 | Machida et al. |

FOREIGN PATENT DOCUMENTS

| CN | 102970488 A | 3/2013 |
| CN | 104349077 A | 2/2015 |
| CN | 107801425 A | 3/2018 |
| EP | 2565843 A2 | 3/2013 |

(Continued)

OTHER PUBLICATIONS

International Search Report and Written Opinion of PCT Application No. PCT/JP2019/005039, dated May 7, 2019, 11 pages of ISRWO.

*Primary Examiner* — Jason A Flohre
*Assistant Examiner* — Angel L Garces-Rivera
(74) *Attorney, Agent, or Firm* — Chip Law Group

(57) ABSTRACT

A signal processing apparatus and a signal processing method that process a signal to control exposure timing of an image sensor, and an imaging device are provided. The signal processing apparatus includes a first adjustment unit that adjusts exposure density in an exposure period, and a second adjustment unit that adjusts a start time and an end time of exposure in a frame period, and provides a control signal to control exposure timing by the exposure density between the start time and the end time, to an image sensor including a mechanism to accumulate photoelectrically converted charge a plurality of times separately and then AD-convert and read out total charge, to allow acquisition of a flicker-free high dynamic range image.

16 Claims, 18 Drawing Sheets

(56) References Cited

FOREIGN PATENT DOCUMENTS

| | | |
|---|---|---|
| JP | 2006-253876 A | 9/2006 |
| JP | 2013-066142 A | 4/2013 |
| JP | 2014-154982 A | 8/2014 |
| JP | 2015-023250 A | 2/2015 |
| JP | 2016-146592 A | 8/2016 |
| JP | 2017-055328 A | 3/2017 |
| JP | 2017-130567 A | 7/2017 |
| KR | 10-2018-0128823 A | 12/2018 |
| WO | 2016/129405 A1 | 8/2016 |
| WO | 2017/169216 A1 | 10/2017 |

*FIG. 17*

| R Short | G Short | R Long | G Short |
| G Long | B Short | G Long | B Long |
| R Long | G Short | R Short | G Short |
| G Long | B Long | G Long | B Short |

*FIG. 18*

| R Short | G Short | R Short | G Short |
| G Short | B Short | G Short | B Shrot |
| R Long | G Long | R Long | G Long |
| G Long | B Long | G Long | B Long |

SIGNAL PROCESSING APPARATUS AND SIGNAL PROCESSING METHOD, AND IMAGING DEVICE

CROSS REFERENCE TO RELATED APPLICATIONS

This application is a U.S. National Phase of International Patent Application No. PCT/JP2019/005039 filed on Feb. 13, 2019, which claims priority benefit of Japanese Patent Application No. JP 2018-098567 filed in the Japan Patent Office on May 23, 2018. Each of the above-referenced applications is hereby incorporated herein by reference in its entirety.

TECHNICAL FIELD

The technology disclosed in the present description relates to a signal processing apparatus and a signal processing method that process a signal to control exposure timing of an image sensor, and an imaging device.

BACKGROUND ART

A complementary metal-oxyde-semiconductor (CMOS) image sensor is configured to temporarily transfer charge generated by photodiodes (PDs) through photoelectric effect in proportion to the amount of light received to floating diffusions (FDs), and perform AD conversion to obtain a digital image signal.

Furthermore, a typical CMOS image sensor uses a rolling shutter that scans row by row. A rolling shutter typically exposes a screen from the top to the bottom thereof row by row in sequence. Thus, even in the same screen, a delay time is produced between the time of starting exposure and readout from the top row and the time of ending exposure and readout from the bottom row. Consequently, there is a problem that a subject especially moving fast is distorted due to difference between the respective exposure and readout times of the rows.

Therefore, in recent years, global shutter CMOS image sensors have been developed which expose simultaneously and read out at once all pixels (for example, see Patent Documents 1 and 2). A rolling shutter image sensor has a pixel structure in which charge accumulated in a PD is transferred to an FD and then AD-converted. On the other hand, a global shutter image sensor has a pixel structure in which charge is accumulated in PDs at the same timing for all pixels and then transferred to analog memories (MEMs), and the charge accumulated in the analog memories is transferred, row by row, to FDs and AD-converted. According to a global shutter, all rows have the same exposure and readout time. Thus, when a fast-moving subject is imaged, distortion caused by difference in exposure and readout time does not occur.

A global shutter CMOS image sensor includes analog memories (described above) that accumulate charge. This allows an operation such as transferring charge accumulated in a photodiode a plurality of times and then AD-converting it. CMOS image sensors can be said to have a structure having a relatively high degree of freedom in exposure and readout timing.

CITATION LIST

Patent Documents

Patent Document 1: Japanese Patent Application Laid-Open No. 2015-23250
Patent Document 2: Japanese Patent Application Laid-Open No. 2017-130567
Patent Document 3: Japanese Patent Application Laid-Open No. 2006-253876
Patent Document 4: Japanese Patent Application Laid-Open No. 2017-55328

SUMMARY OF THE INVENTION

Problems to be Solved by the Invention

It is an object of the technology disclosed in the present description to provide a signal processing apparatus and a signal processing method that process a signal to control the exposure timing of an image sensor, and an imaging device.

Solutions to Problems

A first aspect of the technology disclosed in the present description is a signal processing apparatus that processes a control signal to control exposure timing in an image sensor including a mechanism to accumulate photoelectrically converted charge a plurality of times separately and then AD-convert and read out total charge, the signal processing apparatus including:

a first adjustment unit that adjusts exposure density in an exposure period;

a second adjustment unit that adjusts a start time and an end time of exposure in a frame period; and a generation unit that generates the control signal to control the exposure timing by the exposure density in the exposure period including the start time and the end time.

The signal processing apparatus according to the first aspect includes a plurality of the generation units each including the first adjustment unit and the second adjustment unit, and a control signal including a different exposure period or exposure density generated by each of the plurality of generation units is provided to each pixel of the image sensor, thereby allowing the acquisition of an HDR image by a method of capturing a single image in different exposure times (brightness) at different pixels. Further, the plurality of generation units may generate control signals each of which includes a different exposure density and any of which includes an exposure period that is an integral multiple of a flicker period. Further, the plurality of generation units may generate respective control signals different from each other in exposure density in the same exposure period, to prevent image failure.

Further, the signal processing apparatus according to the first aspect may further include a gain processing unit that performs gain correction on pixel data on the basis of a ratio in exposure time between pixels, and a difference calculation unit that calculates difference between corresponding pixels after the gain correction is performed, and detects change in brightness over time on the basis of difference information, and the plurality of generation units may generate control signals that prevent occurrence of flicker. Further, a recording unit that accumulates an amount of difference calculated by the difference calculation unit for a predetermined time may be further included, and flicker may be detected on the basis of periodicity of the change in brightness.

Further, the signal processing apparatus according to the first aspect may further include a brightness detection unit that detects brightness of a pixel of interest in a first image after the gain correction, and a blend processing unit that determines, on the basis of a result of detection in the brightness detection unit, a blend ratio between the first image and a second image captured under an exposure condition that an exposure enabling period is short or a third image captured under an exposure condition that an exposure enabling period is long, and blends the first image and the second image or the third image. For example, when the pixel of interest is long-time exposed, the blend processing unit may increase the blend ratio of the first image in a low-brightness pixel area for blend, and increase the blend ratio of the second pixel area in a high-brightness pixel area for blend, to prevent pixel saturation.

Further, a second aspect of the technology disclosed in the present description is a signal processing method that processes a control signal to control exposure timing in an image sensor including a mechanism to accumulate photoelectrically converted charge a plurality of times separately and then AD-convert and read out total charge, the signal processing method including:

a first adjustment step of adjusting exposure density in an exposure period;

a second adjustment step of adjusting a start time and an end time of exposure in a frame period; and a generation step of generating the control signal to control the exposure timing by the exposure density in the exposure period including the start time and the end time.

Further, a third aspect of the technology disclosed in the present description is an imaging device including:

an image sensor including a mechanism to accumulate photoelectrically converted charge a plurality of times separately and then AD-convert and read out total charge; and a controller that controls exposure timing in the image sensor, the controller including:

a first adjustment unit that adjusts exposure density in an exposure period;

a second adjustment unit that adjusts a start time and an end time of exposure in a frame period; and a generation unit that generates the control signal to control the exposure timing by the exposure density in the exposure period including the start time and the end time.

Effects of the Invention

The technology disclosed in the present description allows the provision of a signal processing apparatus and a signal processing method that process a signal to control the exposure timing of an image sensor so as to be able to acquire an image with a high dynamic range without failure even if a moving subject is included, and an imaging device.

Furthermore, the technology disclosed in the present description allows the provision of a signal processing apparatus and a signal processing method that process a signal to control the exposure timing of an image sensor so as to be able to acquire a flicker-free image even in a bright scene, and an imaging device.

Note that the effects described in the present description are merely examples, and the effects of the present invention are not limited to them. Furthermore, the present invention may achieve additional effects other than the above-described effects.

Still another object, feature, and advantage of the technology disclosed in the present description will become apparent from an embodiment described below and more detailed description with reference to the accompanying drawings.

BRIEF DESCRIPTION OF DRAWINGS

FIG. 17 is a diagram showing an example in which a wiring pattern of the pixel array 103 is shown in combination with a color array.

FIG. 18 is a diagram showing an example in which a wiring pattern of the pixel array 103 is shown in combination with a color array.

MODE FOR CARRYING OUT THE INVENTION

Figure 1:
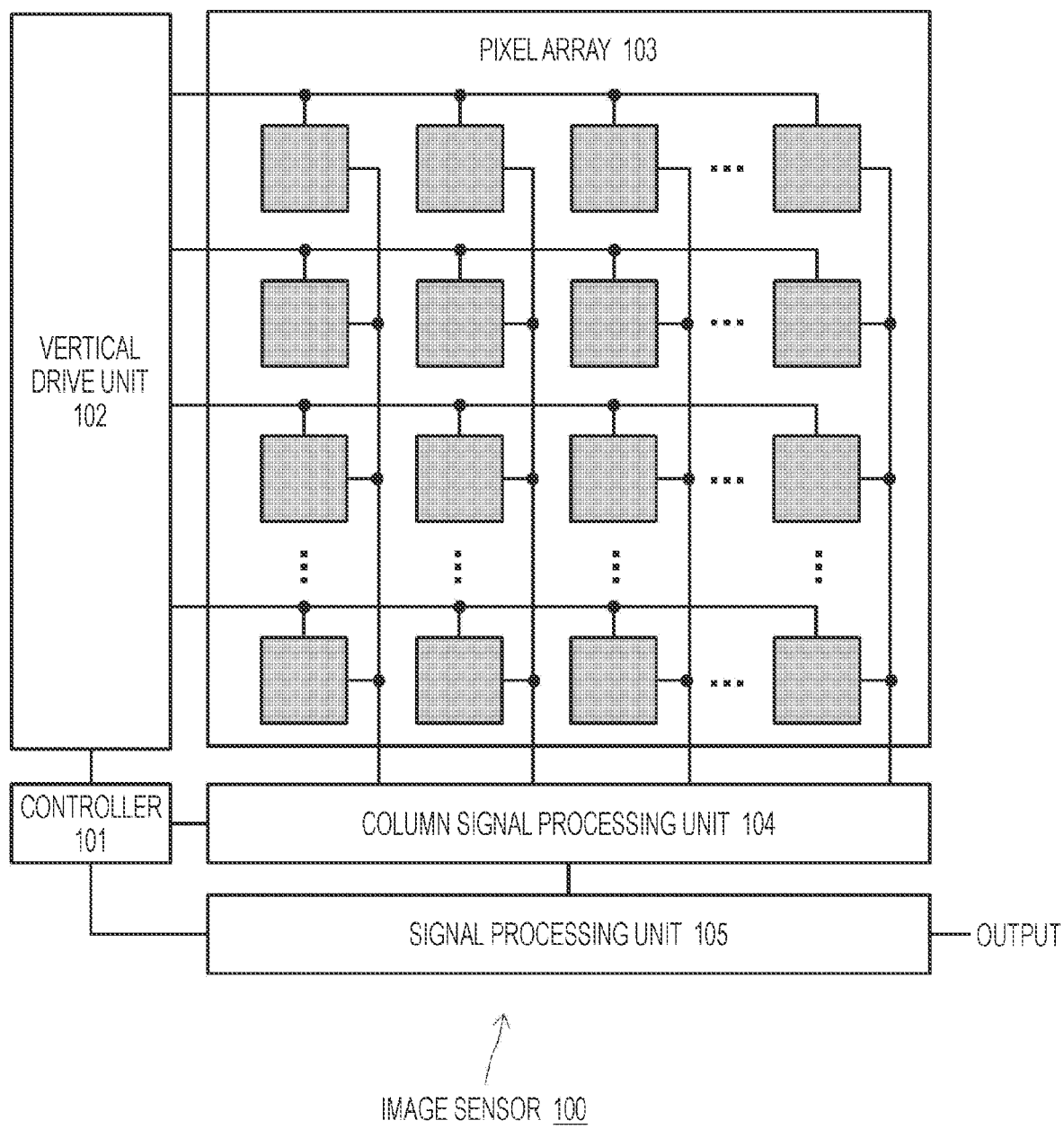
FIG. 1 is a diagram illustrating a structure of an image sensor 100.

Hereinafter, an embodiment of the technology disclosed in the present description will be described in detail with reference to the drawings.

A global shutter CMOS image sensor has a memory mechanism (MEM) to accumulate photoelectrically converted charge, and includes a mechanism to accumulate charge in a photodiode (PD) at a desired timing, transfer accumulated charge to the memory mechanism a plurality of times for accumulation, and AD-convert and read out the total accumulated charge. In short, a global shutter CMOS image sensor is a mechanism to accumulate photoelectrically converted charge a plurality of times separately, and then AD-convert and read out the total charge.

On the other hand, images have increasingly come to have high dynamic range (HDR). The dynamic range of an image is represented by the ratio of the minimum brightness to the peak brightness. An HDR image has a contrast ratio between the highest lightness of color and the lowest lightness of color reaching, for example, 10000:1 or higher. An HDR image records all levels of brightness in a visible range, and thus can support a dynamic range and a color gamut equivalent to human visual characteristics, to realistically represent the real world.

Methods of acquiring an HDR image include, for example, two ways, a method of combining a plurality of images captured in different exposure times (brightness), and a method of capturing a single image in different exposure times (brightness) at different pixels. The former method can obtain an image with high dynamic range by extracting properly exposed portions from each of a plurality of images different in exposure time (extracting a dark area from a long-time exposed image and extracting a bright area from a short-time exposed image), and combining them. On the other hand, the latter method can obtain an image with high dynamic range by performing interpolation processing on pixel data missing under each exposure condition, thereby generating a plurality of interpolated images different in exposure time, and then combining properly exposed portions of the images.

The former method simplifies the structure of an image sensor, but requires frame memory for temporarily storing a plurality of images. Furthermore, the former method superimposes images different in exposure time, and thus has a problem that blurring occurs at the time of imaging a rapidly moving subject.

On the other hand, the latter method, which achieves HDR with a single image, can thus be easily utilized for moving images, eliminates the need for frame memory to store images a plurality of images before, and is superior in the imaging of moving subjects to the former method. The latter method can be implemented using an image pickup device in which pixels having different sensitivities are periodically arranged (for example, see Patent Document 3). However, even by the latter method, an image can be distorted due to difference in the amount of blurring. Incidentally, the latter method requires a dedicated image sensor structure, and reduces resolution because of different exposure control at each pixel.

In addition, power including commercial power is typically an alternating current of 50 Hz or 60 Hz. A light source using the power may vary in intensity with a period of 100 Hz or 120 Hz. It is feared that variations in the intensity of a light source serving as lighting will cause a flicker phenomenon in which brightness changes in an image captured by a CMOS image sensor. In an image affected by flicker, bright and dark stripes of the respective rows appear.

Imaging in an exposure time that is one period in which light and darkness of a light source are included evenly or an integral multiple thereof can prevent flicker. For example, a light source using 50 Hz power generates flicker with a period of 100 Hz. Thus, imaging in an exposure time that is ten milliseconds or an integral multiple thereof can prevent flicker. This is because imaging can be performed while ensuring even variations in the light source in any exposure time, and thus is not affected by flicker. On the contrary, if exposure time is extremely short relative to the flicker period, there is an imaging time with only a strong portion or only a weak portion of the variations of the light source, thus being greatly affected by the light source.

However, when imaging is performed in an exposure time of ten milliseconds in a very bright imaging environment such as the outdoors in the daytime, pixels are saturated, and effective image information cannot be acquired. When imaging is performed with proper brightness with an exposure time of less than ten milliseconds, a traffic light or the like may cause flicker.

Incidentally, there has been proposed an imaging device intended to expand dynamic range in imaging using a global electronic shutter (for example, see Patent Document 4). In this imaging device, a photodiode (PD) is made smaller than an analog memory (MEM), and transfer from the PD to the MEM is performed a plurality of times, thereby increasing the amount of charge that can be accumulated in the MEM. Furthermore, this imaging device acquires an HDR image using a plurality of image frames captured in different exposure times. Images captured at different times in different frames are combined. Thus, there is a problem that a moving subject is blurred.

Therefore, in the present description, a technology will be disclosed below which allows an image sensor with a mechanism to accumulate photoelectrically converted charge a plurality of times separately, and then AD-convert and read out the total charge (described above), to properly control exposure timing, thereby to acquire an HDR image even of a moving subject without distortion, and to acquire a flicker-free image even in a bright scene.

FIG. 1 illustrates a structure of an image sensor 100 to which the technology disclosed in the present description can be applied. The illustrated image sensor 100 includes a controller 101, a vertical drive unit 102, a pixel array 103, a column signal processing unit 104, and a signal processing unit 105. The image sensor 100 is implemented using, for example, CMOS technology.

The pixel array 103 includes a plurality of pixels arranged in two dimensions. In FIG. 1, blocks corresponding to the respective pixels are depicted in gray. In each pixel, charge photoelectrically converted in proportion to the amount of incident light (or light received by the pixel) is accumulated in a photodiode, and output to a vertical signal line as a signal current via an amplifier transistor and a transfer transistor.

From the vertical drive unit 102, horizontal signal lines are provided to provide each pixel in the pixel array 103 with signals to control exposure timing to accumulate photoelectrically converted light and timing to read out accumulated charge.

The column signal processing unit 104 AD-converts signals read out from the pixels in the pixel array 103 row by row for output to the signal processing unit 105.

The signal processing unit 105 performs various types of correction signal processing on an AD-converted digital image signal, and then outputs it to, for example, a camera system (not shown). Further, the signal processing unit 105 generates data necessary for controlling the pixels in the pixel array 103, and feeds it back to the controller 101.

The controller 101 centrally and synchronously controls the respective operations of the vertical drive unit 102, the column signal processing unit 104, and the signal processing unit 105.

Figure 2:
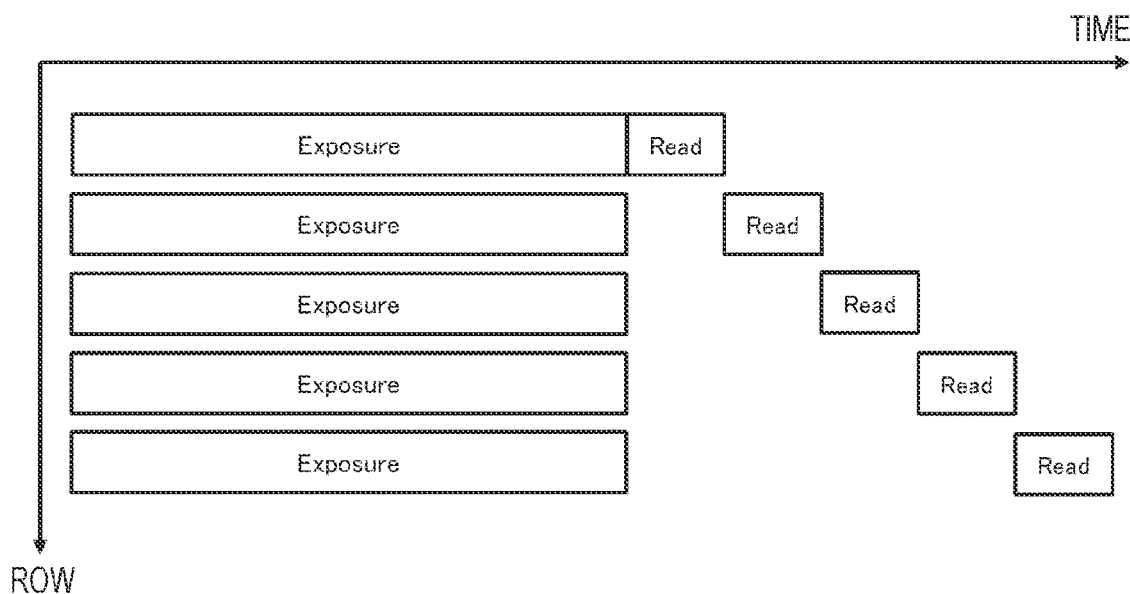
FIG. 2 is a diagram illustrating exposure and readout timings in a global shutter image sensor.
Figure 3:
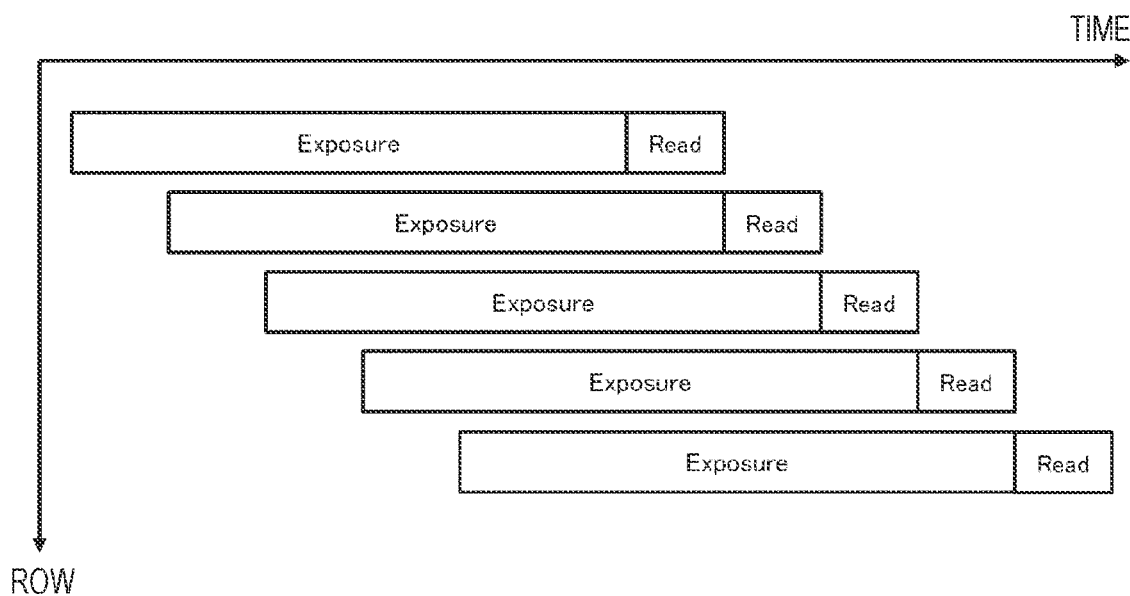
FIG. 3 is a diagram illustrating exposure and readout timings in a rolling shutter image sensor.

As an electronic shutter of a CMOS image sensor, a global shutter has been proposed which starts exposure for all pixels effective for imaging at the same time, and ends the exposure at the same time (described above). FIG. 2 shows a timing example of exposure (Exposure) and readout (Read) of each row in a global shutter image sensor. As shown in FIG. 2, the global shutter performs the exposure (Exposure) of the respective rows at the same time and for the same period, and thereafter, performs readout (Read) of each row in sequence. In addition, for reference, FIG. 3 shows a timing example of exposure (Exposure) and readout (Read) of each row in a rolling shutter image sensor. As shown in FIG. 3, the exposure (Exposure) and readout (Read) of each row are performed in sequence.

As can be seen from FIG. 2, the global shutter performs an operation of simultaneously starting exposure and simultaneously ending exposure for all the pixels effective for imaging. Therefore, it is necessary to mount memories to temporarily store photocharge accumulated by photodiodes while their turns to be read out are awaited after the end of the exposure.

Figure 4:
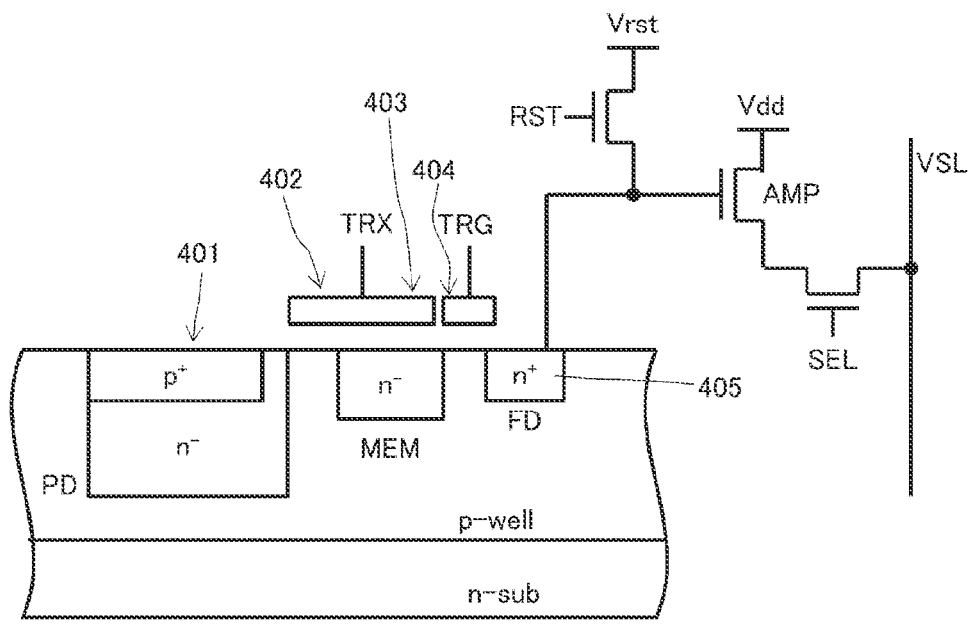
FIG. 4 is a diagram showing a cross section of a unit pixel 400 of the image sensor 100.

FIG. 4 shows a cross-sectional view of a unit pixel 400 included in the pixel array 103 of the image sensor 100 shown in FIG. 1. As shown in the figure, a pixel structure is used in which a memory (MEM) 403 is provided in the unit pixel 400, charge accumulated in a photodiode (PD) 401 is transferred to the memory 403 by a first transfer gate (TRX) 402 simultaneously with that in all the pixels, and the charge is stored until a row-by-row readout operation.

Figure 5:
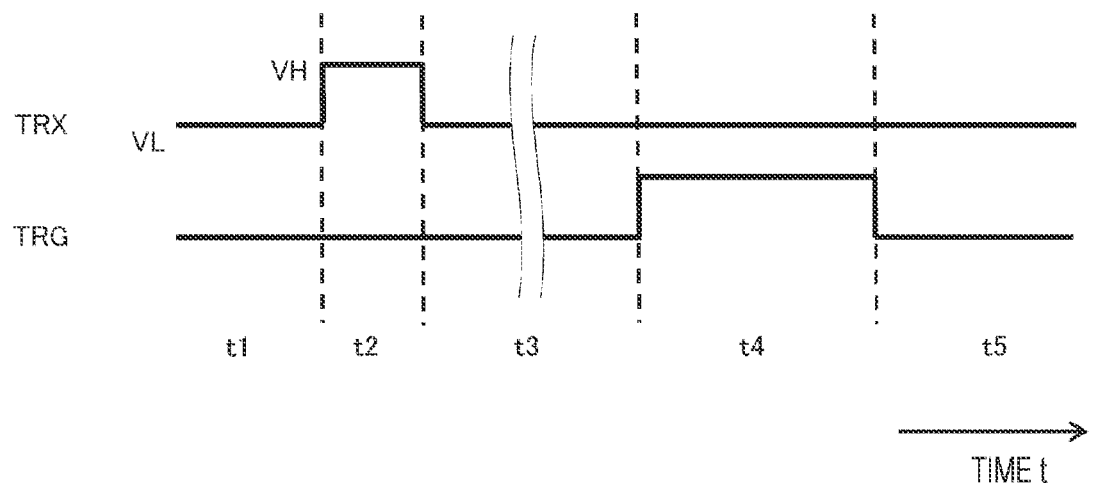
FIG. 5 is a diagram showing drive timings of the unit pixel 400 shown in FIG. 4.
Figure 6:
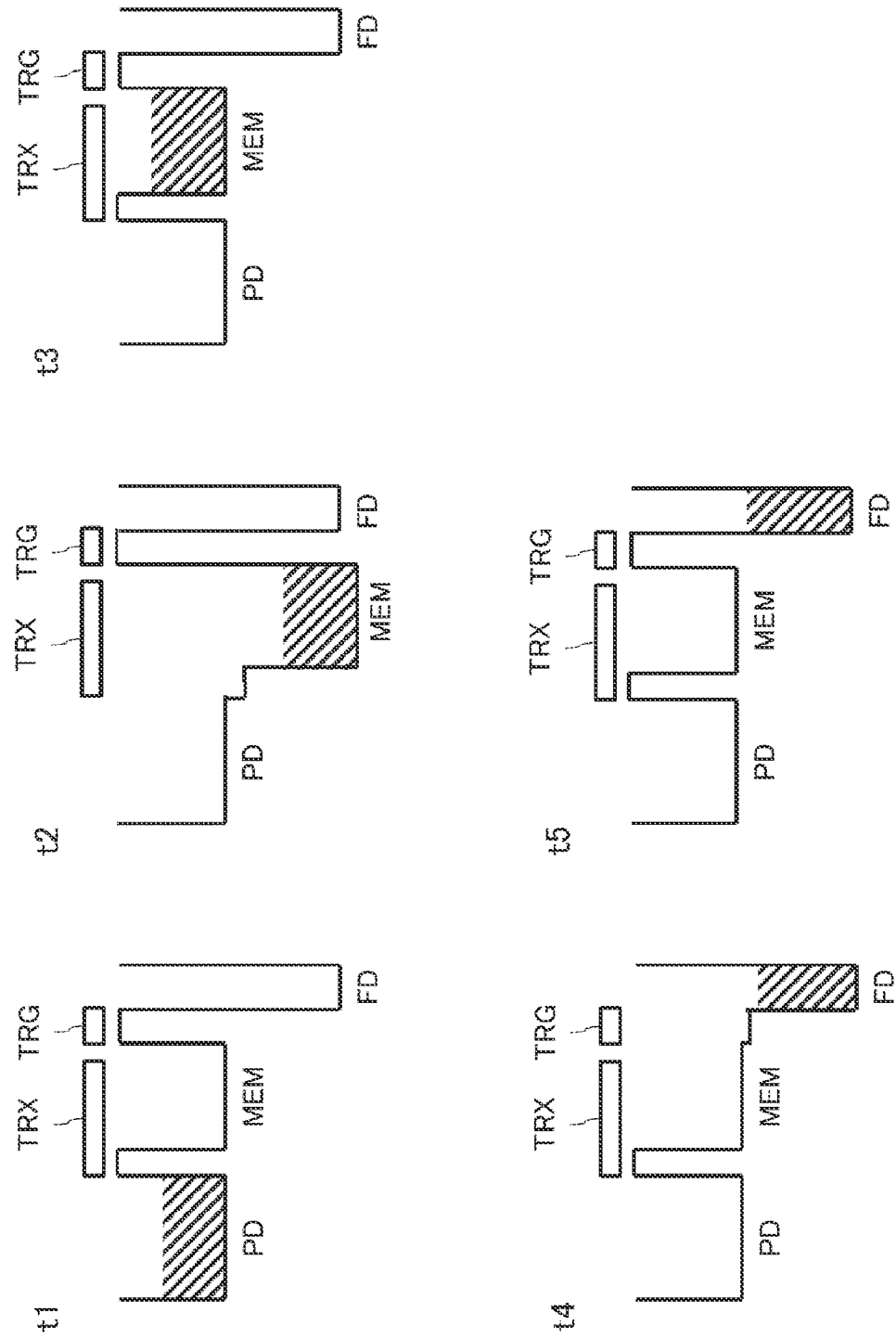
FIG. 6 is a diagram showing changes in potential at different times when the unit pixel 400 shown in FIG. 4 is driven.

FIG. 5 shows drive timings of the unit pixel 400 shown in FIG. 4. Furthermore, FIG. 6 shows potential changes at different times when the unit pixel 400 shown in FIG. 4 is driven. Note that in a potential diagram shown in FIG. 6, states in periods t1 to t5 correspond to those in periods t1 to t5 in a timing chart shown in FIG. 5, respectively. A method of driving the unit pixel 400 will be described with reference to FIGS. 5 and 6.

In the period t1, after charge in the photodiode 401 and the memory 403 is discharged, charge newly obtained from light from a subject is accumulated in the photodiode 401 simultaneously with that in all the pixels. Further, in the period t2, when the voltage level of a drive signal applied to the gate electrode of the first transfer gate 402 becomes a VH level, the charge accumulated in the photodiode 401 is transferred to the memory 403. Then, in the period t3, when the voltage level of the drive signal applied to the gate electrode of the first transfer gate 402 becomes a VL level, the charge is stored in the memory 403.

After that, in the period t4, when the voltage level of a drive signal applied to the gate electrode of a second transfer gate (TRG) 404 becomes a VH level, the charge stored in the memory 403 is transferred to a floating diffusion (FD) 405. Then, in the period t5, when the voltage level of the drive signal applied to the gate electrode of the second transfer gate 404 becomes a VL level, a voltage corresponding to the charge stored in the floating diffusion 405 is read out as a signal level.

The period t1 in which charge obtained from light from a subject is accumulated in the photodiode 401 corresponds to an exposure period. By applying the drive signal of the VH-level voltage to the gate electrode of the first transfer gate 402, exposure timing can be controlled. The exposure timing control is basically performed by the vertical drive unit 102 and the controller 101.

Figure 7:
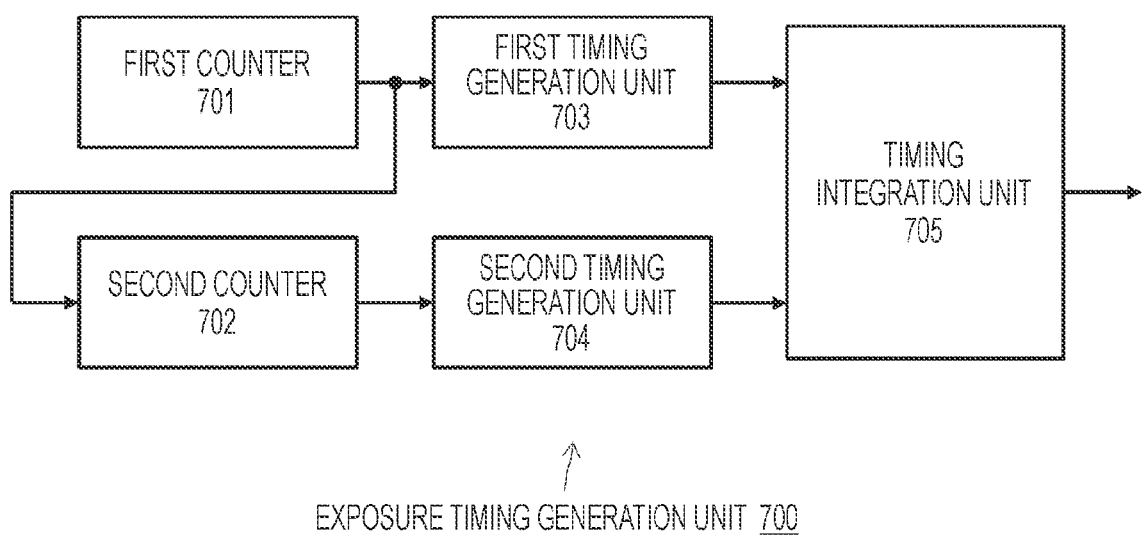
FIG. 7 is a diagram showing a configuration example of an exposure timing generation unit 700.

FIG. 7 shows a configuration example of an exposure timing generation unit 700 applicable to the image sensor 100 according to the present embodiment. The exposure timing generation unit 700 shown in the figure includes two timing adjustment mechanisms. By generating an exposure timing with them integrated, a mechanism is implemented which adjusts exposure timing (that is, exposure start and end timing, or the length of the exposure period), and exposure density in the exposure period. The exposure timing generation unit 700 like this is incorporated into the vertical drive unit 102 of the image sensor 100, for example.

Figure 8:
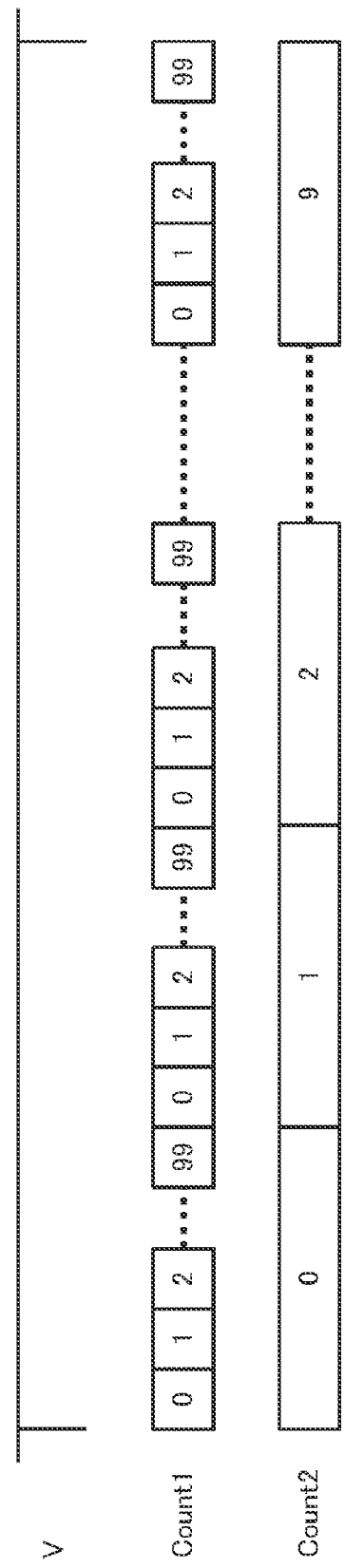
FIG. 8 is a diagram showing an operation example of a first counter 701 and a second counter 702.

A first counter 701 counts at small intervals, and a second counter 702 counts at large intervals. FIG. 8 shows an operation example of the first counter 701 and the second counter 702. In the example shown in FIG. 8, every time the count value Count1 of the first counter 701 is incremented from 0 to 99, the count value Count2 of the second counter 702 is incremented by one. Furthermore, when the count value Count1 of the first counter 701 reaches 99, it is reset to 0. When the count value Count2 of the second counter 702 reaches 9, it is reset to 0. Note that the count period of the second counter 702 is set to the frame period V of an image.

Figure 9:
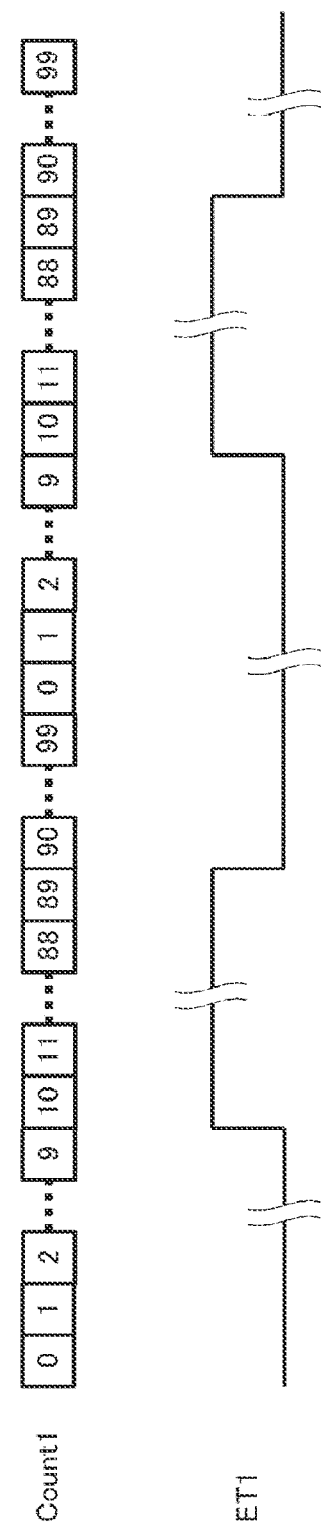
FIG. 9 is a diagram showing an example in which the count value of the first counter 701 is subjected to threshold processing by one timing generation unit 703.

A first timing generation unit 703 performs threshold processing on the count value Count1 of the first counter 701 to control exposure density. FIG. 9 shows an example of the threshold processing on the count value Count1 of the first counter 701 by the first timing generation unit 703. In the figure, for the count value Count1 of the first counter 701, 10 is set as an exposure start threshold, and 89 as an exposure end threshold. Thus, the first timing generation unit 703 outputs a first exposure timing signal ET1 having a pulse at a high level in a period during which the counter value Count1 of the first counter 701 is 10 to 89.

Likewise, a second timing generation unit 704 sets an exposure start threshold and end threshold for the count value Count2 of the second counter 702, and outputs a second exposure timing signal ET2 having a pulse at a high level in a period during which the counter value Count2 of the second counter 702 is the exposure start threshold to end threshold (not shown).

Then, a timing integration unit 705 integrates the first exposure timing signal ET1 output from the first timing generation unit 703 and the second exposure timing signal ET2 output from the second timing generation unit 704 to generate a final exposure timing signal ET. Here, the timing integration unit 705 takes the logical product of the first exposure timing signal ET1 and the second exposure timing signal ET2 for integration, which is mirror provided to the image sensor 400 as a final output of the exposure timing generation unit 700.

As described above, the first counter 701 counts at small intervals, and the second counter 702 counts at large intervals. Therefore, by the timing integration unit 705 taking the logical product of the first exposure timing signal ET1 and the second exposure timing signal ET2, the final exposure timing signal ET becomes a signal ET including the exposure timing determined by the threshold processing by the second timing generation unit 704 (that is, the exposure start and end timing, or the length of the exposure period), and the exposure density determined by the threshold processing by the first timing generation unit 703.

Figure 10:
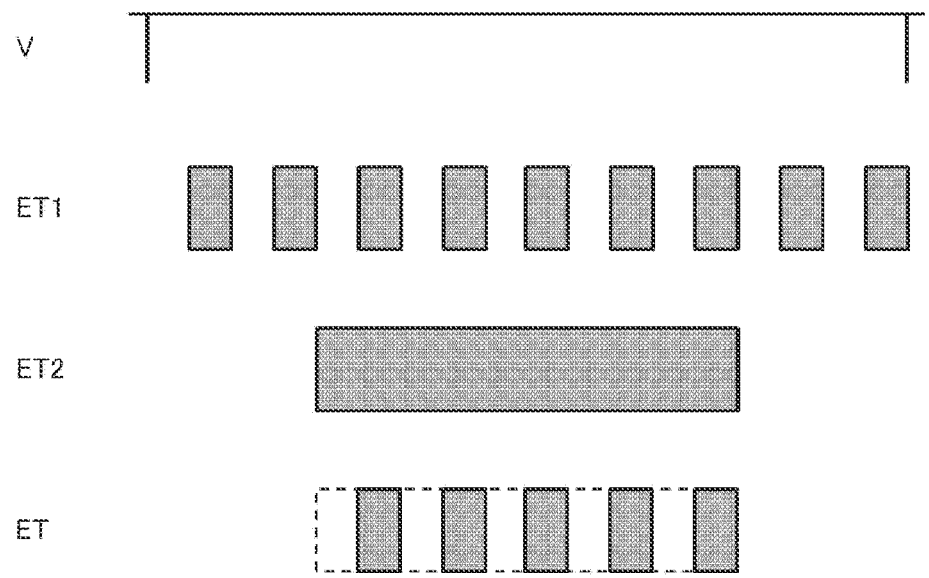
FIG. 10 is a diagram showing a timing chart in which a timing integration unit 705 shows a first exposure timing signal ET1, a second exposure timing signal ET2, and a final exposure timing signal ET.

FIG. 10 shows a timing chart in which the timing integration unit 705 shows the first exposure timing signal ET1, the second exposure timing signal ET2, and the final exposure timing signal ET. In the figure, the horizontal axis is a time axis, and gray squares represent exposure enabling periods in which the timing signals ET1 and ET2 are at the high level.

The first exposure timing signal ET1 includes density control timing, and represents exposure enabling time in a minute period (the count period of the first counter 701). On the other hand, the second exposure timing signal ET2 includes exposure timing, and represents exposure start timing and end timing in a large time interval (the count period of the second counter 702 or the frame period V). Then, the final exposure timing signal ET is a signal obtained by taking the logical product of the first exposure timing signal ET1 and the second exposure timing signal ET2.

Figure 11:
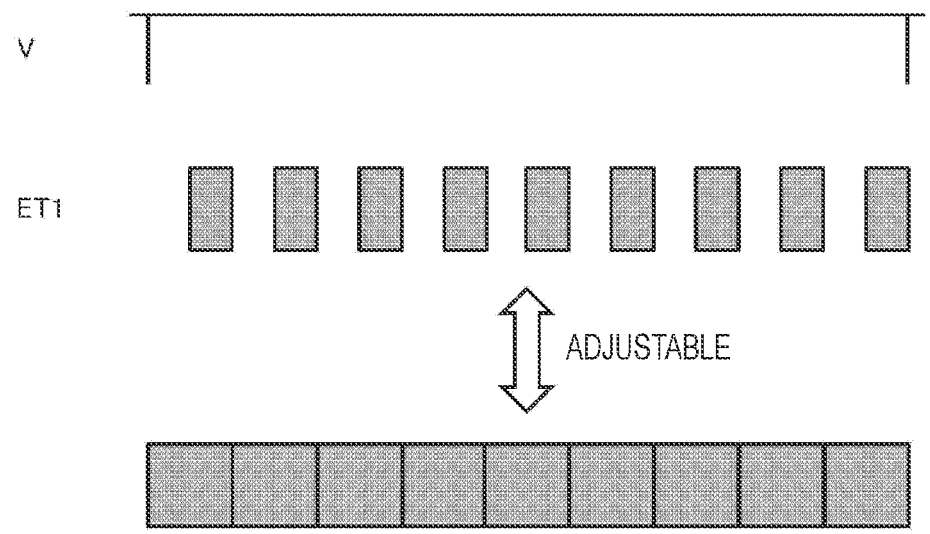
FIG. 11 is a diagram showing a mechanism for adjusting the exposure density of the first exposure timing signal ET1 at each count period of the first counter 701.
Figure 12:
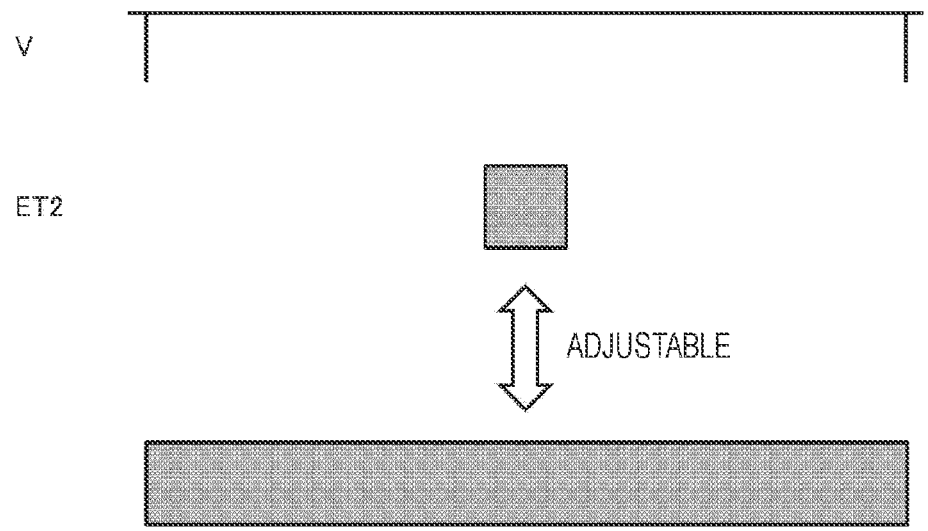
FIG. 12 is a diagram showing a mechanism for adjusting the exposure density of the second exposure timing signal ET2 at each frame period V.

FIG. 11 shows a mechanism for adjusting the exposure density of the first exposure timing signal ET1 at each count period of the first counter 701. The first timing generation unit 703 adjusts the exposure enabling period in each count period of the first counter 701. Furthermore, FIG. 12 shows a mechanism for adjusting the exposure density of the second exposure timing signal ET2 at each count period of the second counter 702 (or frame period V). The second timing generation unit 704 adjusts the exposure enabling period in each count period of the second counter 702 (or the frame period V). Then, the timing integration unit 705 takes the logical product of the first exposure timing signal ET1 and the second exposure timing signal ET2 as a final exposure enabling period of the exposure timing generation unit 700. Consequently, the time between the exposure start and end, and the exposure density during that time can be adjusted as desired, which should be fully understood.

A plurality of the exposure timing generation units as described above which can adjust both the exposure timing (exposure start time and end time) in the frame period V and the exposure density in the exposure period, can be provided for a single image pickup device (or the pixel array 103), to provide an exposure timing signal with a different exposure timing and exposure density to each pixel (or each pixel block divided according to a predetermined rule).

Figure 13:
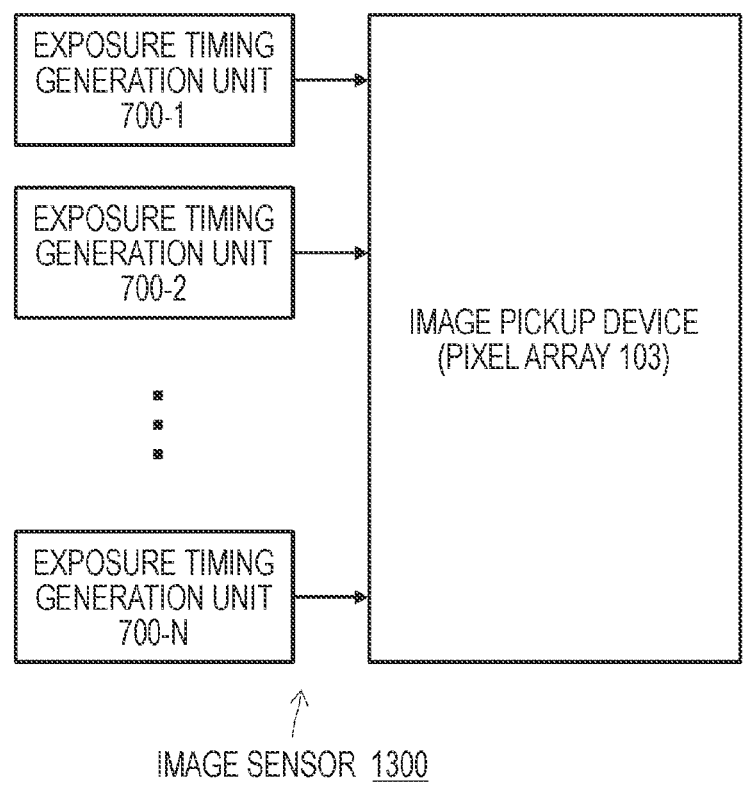
FIG. 13 is a diagram showing a configuration example of an image sensor 1300 in which a plurality of exposure timing generation units is provided for a single image pickup device.

FIG. 13 shows a configuration example of an image sensor 1300 in which N exposure timing generation units 700-1, 700-2, ..., 700-N are provided for a single image pickup device (the pixel array 103) (note that N is an integer of two or more). The exposure timing generation units 700-1, 700-2, ..., 700-N are incorporated into the vertical drive unit 102, for example. The exposure timing generation units 700-1, 700-2, ..., 700-N each basically have the configuration shown in FIG. 7, and output an exposure timing signal with a different exposure timing and exposure density. The configuration shown in FIG. 13 allows wiring to provide each pixel with an exposure timing signal from a different exposure timing generation unit, to implement different exposure timing control on each pixel.

Figure 14:
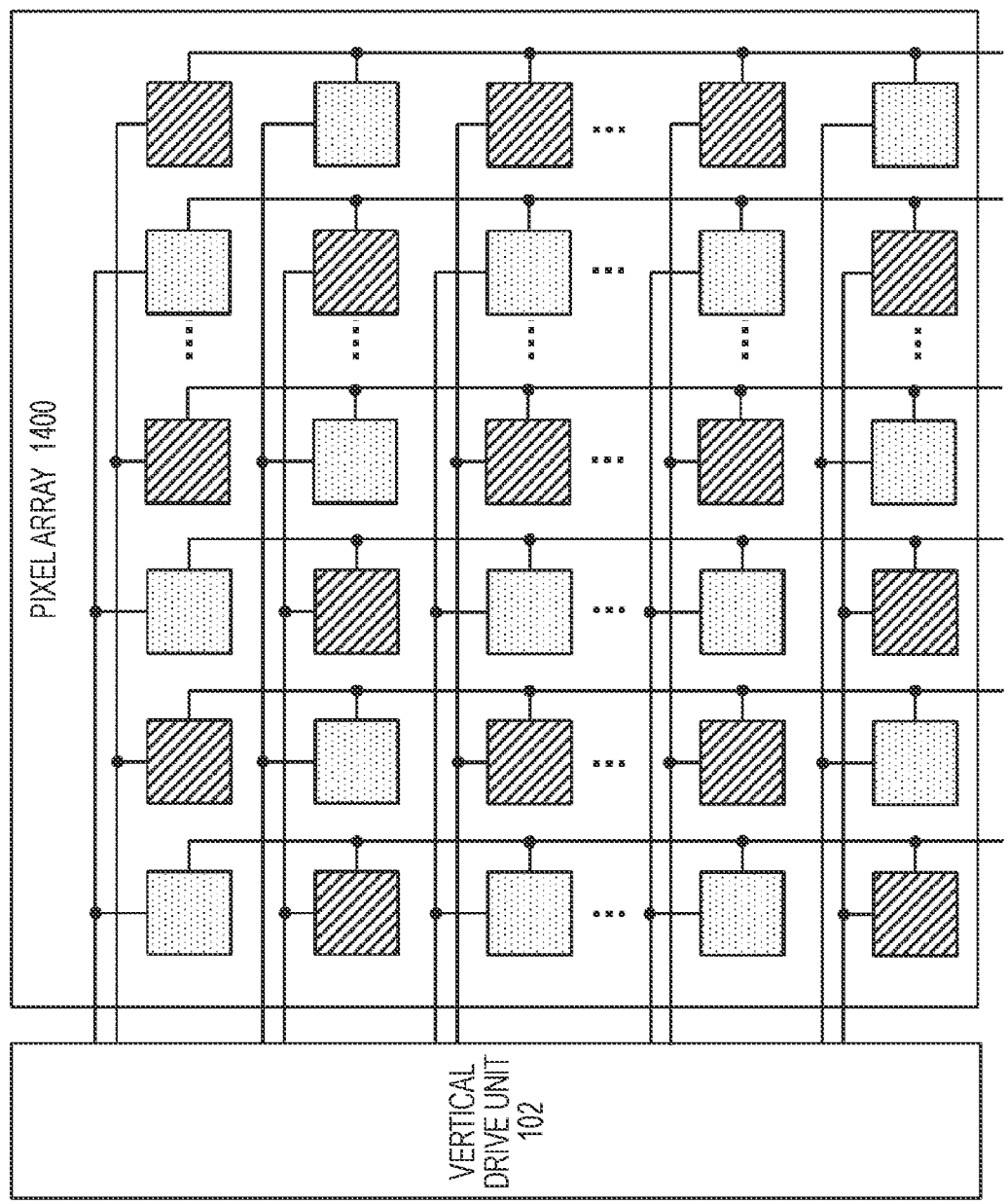
FIG. 14 is a diagram showing a configuration example of a pixel array 1400 that operates on two types of exposure timing signals having different exposure timings and exposure densities.

Furthermore, FIG. 14 shows a configuration example of a pixel array 1400 that operates on two types of exposure timing signals having different exposure timings and exposure densities. Note that for the same functional module as that included in the image sensor 100 shown in FIG. 1, the same reference numeral is assigned.

The vertical drive unit 102 includes exposure timing generation units that generate two types of exposure timing signals having different exposure timings and exposure densities. Furthermore, the pixel array 103 includes a plurality of pixels arranged in two dimensions, and includes a first pixel group including a plurality of pixels filled with diagonal lines, and a second pixel group including the other pixels filled with dots. Then, from the vertical drive unit 102, horizontal signal lines for providing different exposure timing signals are provided to the respective pixel groups. That is, each pixel included in the first pixel group is provided with an exposure timing signal adjusted to a predetermined exposure timing and exposure density, and each pixel included in the second pixel group is provided with an exposure timing signal adjusted to an exposure timing and an exposure density different from those of the exposure timing signal provided to the first pixel group.

In the pixel array 1400 shown in FIG. 14, by providing an exposure timing signal with a different exposure time to each of the first pixel group and the second pixel group, a single image with brightness different between the first pixel group and the second pixel group can be captured, and an HDR image can be acquired. For example, the pixel group filled with dots is provided with an exposure timing signal with a low exposure density to set a first exposure condition (S: Short) that the total exposure enabling period per frame is short, while the pixel group filled with diagonal lines is provided with an exposure timing signal with a high exposure density to set a second exposure condition (L: Long) that the total exposure enabling period per frame is long. This allows the acquisition of a single image including a bright image captured by the former pixel group and a dark image captured by the latter pixel group.

Then, by providing the respective exposure timing signals properly adjusted in not only the length of the exposure period but also the exposure density during the exposure period to both the first pixel group and the second pixel group when acquiring an HDR image as described above, the image sensor 1400 can image a moving subject without causing distortion.

Furthermore, by providing both the first pixel group and the second pixel group with the exposure timing signals adjusted in the exposure period (length between the exposure start timing and end timing) to an integral multiple of the power frequency of a light source when acquiring an HDR image as described above, flicker due to variations in brightness of the light source can be prevented. Then, in a very bright imaging environment such as the outdoors in the daytime, by providing an exposure timing signal adjusted to have a low exposure density during the exposure period, flicker can be prevented while pixel saturation is prevented.

Note that although FIG. 14 shows an example in which the pixels of the first pixel group and the pixels of the second pixel group are arranged in a checkered pattern in the pixel array 103 for the sake of simplification of explanation, the way of arranging pixels having different exposure timings and exposure densities is not limited to this. Alternatively, three or more pixel groups may be provided in the pixel array 103, and three or more types of exposure timing signals adjusted to have different exposure timings and exposure densities may be provided to the respective pixel groups.

Figure 15:
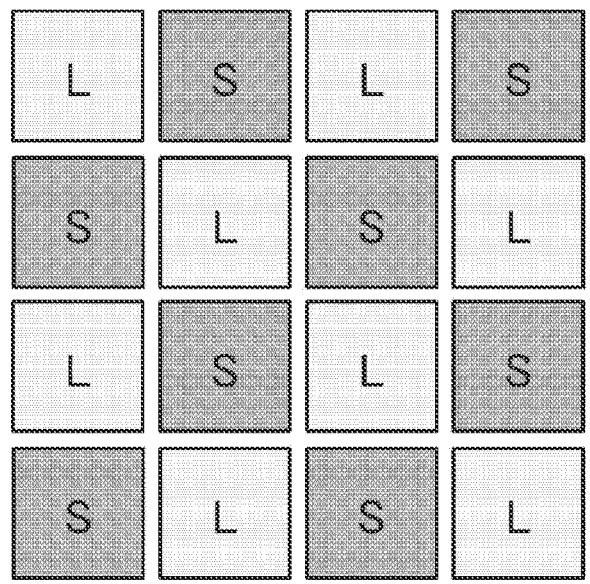
FIG. 15 is a diagram showing an example of a wiring pattern of the pixel array 103.

As shown in FIG. 15, FIG. 14 can be said to be an example of a wiring pattern in which pixels for which the first exposure condition (S) that the total exposure enabling period is short is set, and pixels for which the second exposure condition (L) that the total exposure enabling period is long is set are arranged in a checkered pattern. This wiring pattern allows the pixels under the exposure conditions S and L to be arranged evenly in both the horizontal direction and the vertical direction of the pixel array 103, and thus can achieve acquisition of HDR images and elimination of flicker while preventing deterioration in resolution.

Figure 16:
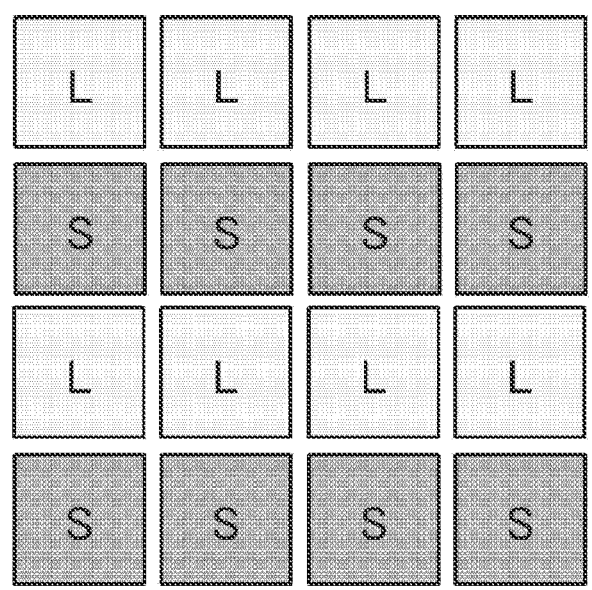
FIG. 16 is a diagram showing another example of the wiring pattern of the pixel array 103.

Further, even an example of a wiring pattern as shown in FIG. 16 in which pixels for which the first exposure condition (S) that the total exposure enabling period is short is set, and pixels for which the second exposure condition (L) that the total exposure enabling period is long is set are arranged in alternate rows by switching between the exposure timing signals row by row in the pixel array 103, can achieve acquisition of HDR images and elimination of flicker as well. Furthermore, the wiring pattern shown in FIG. 16 results in uniform exposure timing control in a row, and thus allows a reduction in the number of horizontal signal lines, and thus also enables pixels to be miniaturized.

Figure 19:
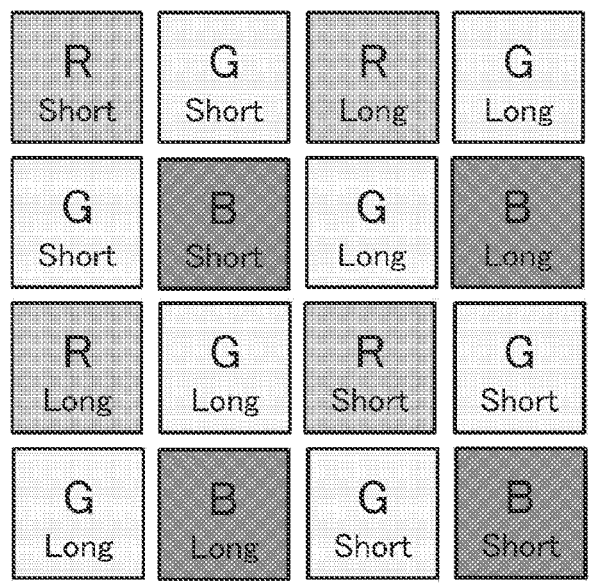
FIG. 19 is a diagram showing an example in which a wiring pattern of the pixel array 103 is shown in combination with a color array.

Furthermore, FIGS. 17 to 19 show examples of wiring patterns combined with the Bayer arrangement of color filters. In the wiring pattern shown in FIG. 17, focusing on each color of RGB, pixels for which the first exposure condition (S) that the total exposure enabling period is short is set, and pixels for which the second exposure condition (L) that the total exposure enabling period is long is set are arranged in a checkered pattern. Furthermore, in the wiring pattern shown in FIG. 18, if a 2×2 pixel block including RGGB is viewed as one unit, 2×2 pixel blocks for which the first exposure condition (S) that the total exposure enabling period is short is set, and 2×2 pixel blocks for which the second exposure condition (L) that the total exposure enabling period is long is set are arranged in alternate rows. Moreover, in the wiring pattern shown in FIG. 19, if a 2×2 pixel block including RGGB is viewed as one unit, 2×2 pixel blocks for which the first exposure condition (S) that the total exposure enabling period is short is set, and 2×2 pixel blocks for which the second exposure condition (L) that the total exposure enabling period is long is set are arranged in a checkered pattern.

The image sensor according to the present embodiment employs a method of capturing a single image in different exposure times at different pixels when acquiring an HDR image. Even in this method, when a moving subject moving quickly is included, it is feared that the image may be distorted due to difference in the amount of blurring. For this, using the exposure timing control mechanism that controls not only the length of the exposure period but also the exposure density during the exposure period as described above allows imaging of a moving subject without distortion.

Figure 24:
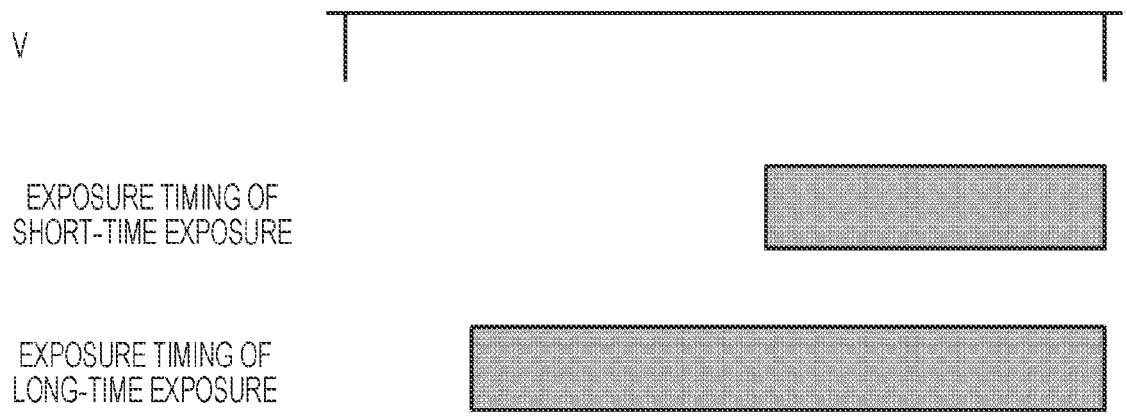
FIG. 24 is a diagram showing an example of exposure timings of short-time exposure and long-time exposure.
Figure 25:
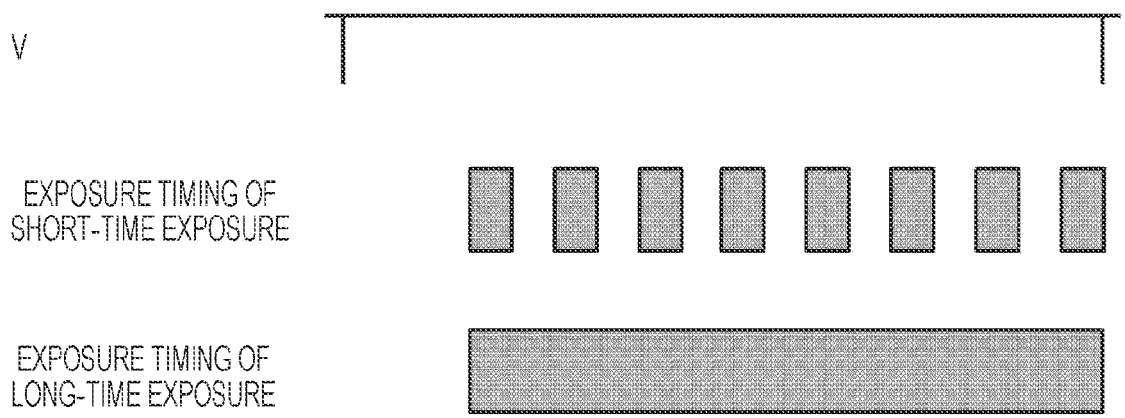
FIG. 25 is a diagram showing an example of exposure timings of short-time exposure and long-time exposure.

If the respective exposure timings of short-time exposure and long-time exposure in a frame are set as shown in FIG. 24 at the time of capturing a single image in different exposure times at different pixels, pixels exposed for the short time and pixels exposed for the long time are largely different in imaging time. Consequently, when a moving subject is imaged, an image without blurring is used in a bright area extracted from a short-time exposed image, while an image with blurring is used in a dark area extracted from a long-time exposed image, resulting in an image failure. By contrast, the image sensor according to the present embodiment, which includes the exposure timing control mechanism that controls the length of the exposure period and the exposure density during the exposure period, independently, thus can set, as shown in FIG. 25, the same exposure period (that is, exposure timing with the same exposure start timing and end timing) for both short-time exposure and long-time exposure, and adjust the exposure enabling period by the exposure density. The exposure timing of the short-time exposure shown in FIG. 25 allows intermittent acquisition of light at the same time as the exposure timing of the long-time exposure. Consequently, a bright area extracted from a short-time exposed image and a dark area extracted from a long-time exposed image have approximately the same amount of blurring of a moving subject. Thus, even if brightness change occurs, a moving subject can be imaged with a high dynamic range.

Furthermore, in order to prevent flicker caused by periodic change in brightness of a light source (such as a light or a traffic light) due to vibrations in AC power, a method is known which captures an image in an exposure time that is an integral multiple of a flicker frequency. However, in an environment such as the outdoors in the daytime where the amount of light is large, and charge collects in pixels immediately to saturation, exposure time needs to be made shorter (than a flicker period), resulting in a problem that occurrence of flicker outdoors in the day time cannot be prevented. For this, the image sensor according to the present embodiment uses the exposure timing control mechanism that controls the length of the exposure period and the exposure density during the exposure period, independently, as described above, to fix the length of the exposure period to a flicker period (or an integral multiple thereof) and adjust only the exposure density according to brightness, thereby to be able to prevent flicker while preventing pixel saturation.

Figure 20:
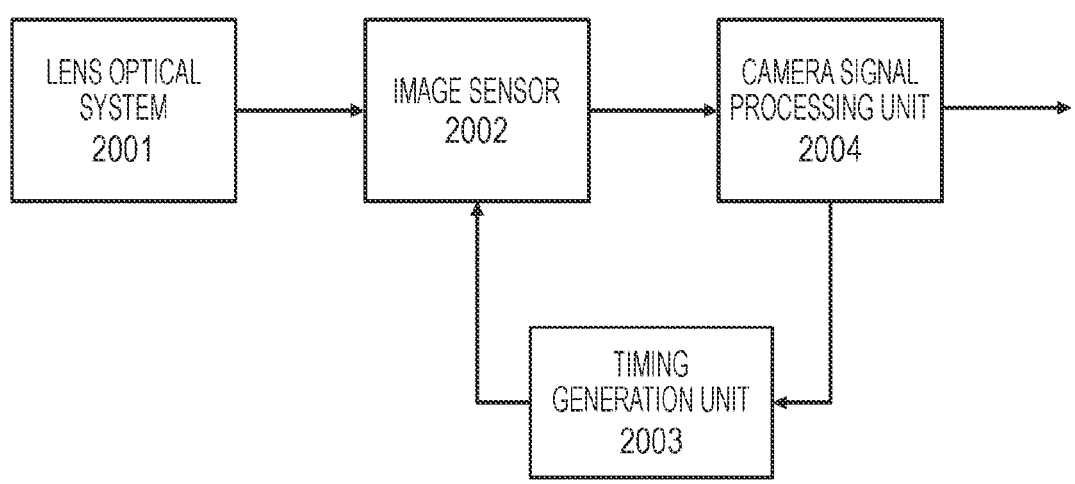
FIG. 20 is a diagram schematically showing a configuration of an imaging device 200.

FIG. 20 schematically shows a configuration example of an imaging device 2000. The imaging device 2000 includes a lens optical system 2001, an image sensor 2002, a timing generation unit 2003, and a camera signal processing unit 2004. The imaging device 2000 corresponds to a so-called digital camera.

The image sensor 2002 includes a pixel array including a plurality of pixels arranged in two dimensions. The lens optical system 2001 includes one or a combination of a plurality of optical lenses, and forms an image of reflected light from a subject on an imaging surface of the image sensor 2002. The lens optical system 2001 may include a stop or the like, which is omitted here for the sake of simplification of explanation.

The timing generation unit 2003 generates, for the image sensor 2002, an exposure timing signal for controlling the exposure timing of each pixel, and provides it to the pixel via a horizontal signal line in the image sensor 2002. In the image sensor 2002, according to the exposure timing signal, the vertical drive unit 102 outputs, to the horizontal signal lines, a drive signal for outputting charge in each pixel of the pixel array 103 line by line in the vertical direction.

In the present embodiment, the timing generation unit 2003 has a configuration as shown in FIG. 7, for example, and can generate an exposure timing signal with exposure timing and exposure density adjusted. Then, the timing generation unit 2003 provides an exposure timing signal with a different exposure timing and exposure density to each pixel (or each pixel block divided according to a predetermined rule) in the image sensor 2002. Further, the image sensor 2002 has a wiring pattern of the horizontal signal lines that allows a different exposure timing signal to be input to each pixel (or each pixel block divided according to a predetermined rule).

The camera signal processing unit 2004 performs analog front-end processing on a RAW signal from the image sensor 2002 to convert it into a digital image signal, performs preprocessing such as defective pixel correction, digital clamp, and digital gain control, and then applies white balance (WB) gain by AWB, and performs image quality correction processing such as sharpness and contrast adjustment to reproduce a proper color state, and further performs demosaicing to generate an RGB image signal. Note that in the analog front-end processing, low noise in a signal received from the image sensor 2002 is suppressed with high accuracy (correlated double sampling: CDS), and then sample and hold is performed, and further proper gain control is applied by automatic gain control (AGC) to perform AD conversion. Further, image quality correction in the digital domain may include processing such as flash light control and red-eye reduction. Furthermore, the camera signal processing unit 2004 performs γ correction on the RGB image signal, thereby converting image information into a tone suitable for monitor output, printout, or image recording.

Moreover, the camera signal processing unit 2004 operates exposure control on the basis of information such as the brightness of the RAW signal input from the image sensor 2002, to generate a proper brightness parameter. The timing generation unit 2003 determines proper exposure timing of the image sensor 2002 on the basis of the parameter provided from the camera signal processing unit 2004, in view of circumstances such as dynamic range and flicker.

The timing generation unit 2003 includes the exposure timing control mechanism that controls the length of the exposure period and the exposure density during the exposure period, independently, as shown in FIG. 7 (see, for example, FIGS. 10 to 12). Thus, the length of the exposure period is fixed to a flicker period (or an integral multiple thereof), and an exposure timing signal adjusted only in exposure density according to brightness is provided to the image sensor 2002, thereby allowing the acquisition of a flicker-free image while preventing pixel saturation.

Figure 21:
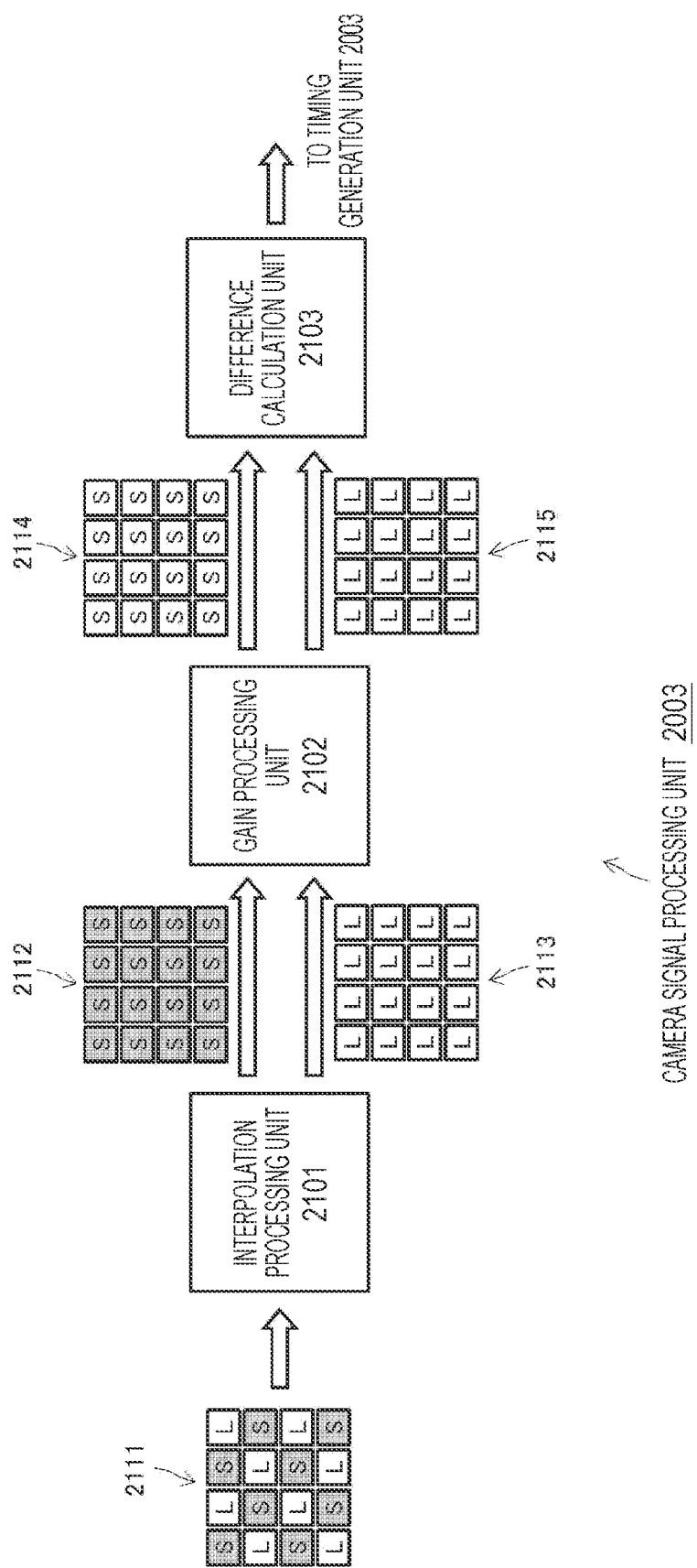
FIG. 21 is a diagram for explaining processing performed by a camera signal processing unit 2004.

An example of processing performed by the camera signal processing unit 2004 in an operation to prevent flicker as described above will be described with reference to FIG. 21.

From the image sensor 2002, an image data 2111 is output which is captured by a pixel array in which pixels for which the first exposure condition (S) that the total exposure enabling period is short is set and pixels for which the second exposure condition (L) that the total exposure enabling period is long is set are arranged alternately.

Figure 22:
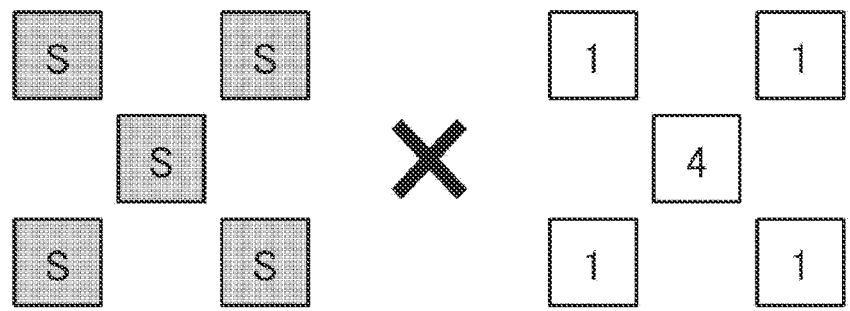
FIG. 22 is a diagram illustrating a low-pass filter for pixel interpolation.
Figure 23:
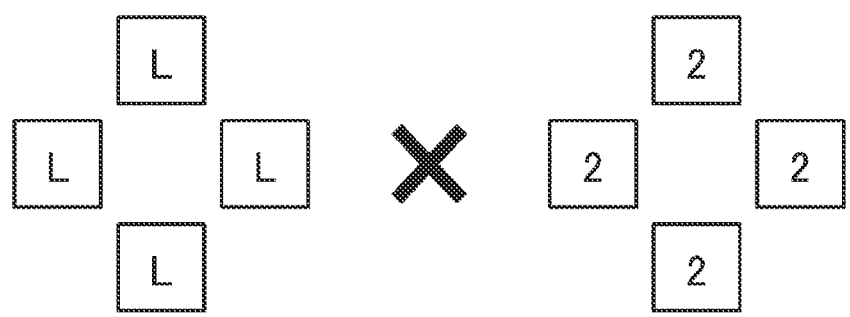
FIG. 23 is a diagram illustrating a low-pass filter for pixel interpolation.

The image data 2111 input from the image sensor 2002 contains a mixture of pixel values captured by the pixels under the different exposure conditions. Therefore, in the camera signal processing unit 2004, first, an interpolation processing unit 2101 performs interpolation processing to interpolate pixel positions where pixel data under the first exposure condition (S) that the total exposure enabling period is short are missing, to generate an interpolated image 2112, and to interpolate pixel positions where pixel data under the second exposure condition (L) that the total exposure enabling period is long are missing, to generate an interpolated image 2113. For example, by applying low-pass filters (LPF) shown in FIGS. 22 and 23 to the input image 2111, all-pixel interpolation can be performed.

The interpolated image 2112 and the interpolated image 2113 are different in exposure condition. Thus, the gain processing unit 2102 performs gain processing for sensitivity compensation. For example, when the total exposure enabling period in the first exposure condition (S) is one millisecond, and the total exposure enabling period in the second exposure condition (L) is four milliseconds, the sensitivity of the interpolated image 2113 differs from that of the interpolated image 2112 by four times. Thus, in order to compensate for the ratio in the exposure enabling periods (or the sensitivity ratio) between the two images 2112 and 2113, the gain processing unit 2102 applies a four-fold gain to the interpolated image 2112 (that is, the pixel data captured under the first exposure condition that the total exposure enabling period is short), thereby making it to have the same sensitivity as the interpolated image 2113.

For an interpolated image 2114 adjusted in brightness by the gain and an interpolated image 2115, the pixel values of corresponding pixels are approximately equal values if there is no flicker or subject movement. However, when flicker is included, difference is produced between the interpolated image 2114 and the interpolated image 2115. Thus, the difference calculation unit 2103 calculates the amount of difference in pixel values between the interpolated image 2114 and the interpolated image 2115, to detect change in brightness over time. Then, this detection result is output to the timing generation unit 2003 to be utilized for the control of exposure timing.

For example, the difference calculation unit 2103 calculates a difference absolute value D between the interpolated image 2114 and the interpolated image 2115 by Equation (1) below to estimate the presence or absence of flicker, where A(i, j) is the pixel value of the pixel in the i-th row and j-th column of the interpolated image 2114 under the first exposure condition (S), and B(i, j) is the pixel value of the pixel in the i-th row and j-th column of the interpolated image 2115 under the second exposure condition (L).

[Equation 1]

$$D=\Sigma_{i,j}|A(i,j)-B(i,j)| \qquad (1)$$

Flicker is caused by the periodical brightness change of a light source due to a power frequency such as 100 Hz or 120 Hz. Thus, the difference calculation unit 2103 can accumulate a detection signal D calculated for each frame using Equation (1) above, that is, information on brightness change over time for a fixed time, and examine the periodicity of the brightness change over a predetermined time (or a plurality of frames), thereby detecting flicker (brightness change) with higher accuracy.

Then, the timing generation unit 2003 generates an exposure pattern that prevents occurrence of flicker in a scene with flicker, on the basis of the result of the detection by the difference calculation unit 2103. Specifically, under any of the exposure conditions, the exposure period (that is, the length between exposure start timing and end timing) is set to an integral multiple of a flicker period (when the timing generation unit 700 shown in FIG. 7 is used, the second timing generation unit 704 performs threshold processing on the count value of the second counter 702 so that the exposure period becomes an integral multiple of the flicker period). Further, the exposure density in that exposure period is adjusted to provide an exposure enabling period satisfying an exposure condition (when the timing generation unit 700 shown in FIG. 7 is used, the first timing generation unit 704 performs threshold processing on the count value of the first counter 701 to provide a desired exposure density).

Figure 26:
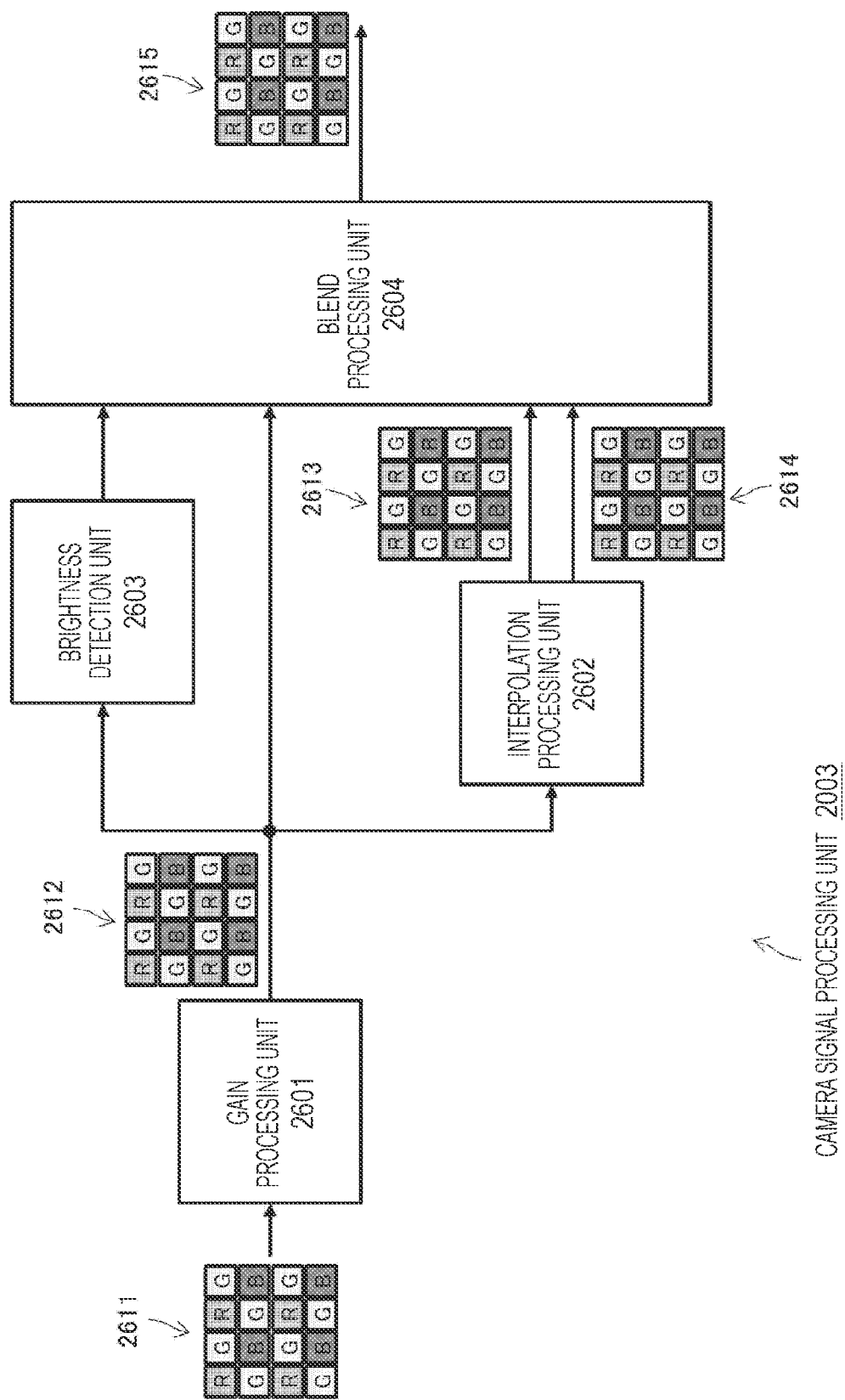
FIG. 26 is a diagram for explaining processing performed by the camera signal processing unit 2004.

FIG. 26 shows another example of processing performed by the camera signal processing unit 2004.

Here, it is assumed that the image sensor 2002 has a pixel array in which pixels for which the first exposure condition (S) that the total exposure enabling period is short is set and pixels for which the second exposure condition (L) that the total exposure enabling period is long is set are arranged in a checkered pattern. Then, a Bayer image 2611 as shown in FIG. 17 is input from the image sensor 2002 to the camera signal processing unit 2004.

As can be seen also from FIG. 17, the Bayer image 2611 contains pixels for which the first exposure condition (S) that the total exposure enabling period is short is set and pixels for which the second exposure condition (L) that the total exposure enabling period is long is set. Thus, in order to compensate for the ratio in exposure enabling periods (that is, the sensitivity ratio) between the pixels under the different exposure conditions, the gain processing unit 2601 performs gain processing according to the sensitivity ratio on pixel data of the pixels of low sensitivity.

A Bayer image 2612 after the gain processing is provided to an interpolation processing unit 2602, a brightness detection unit 2603, and a blend processing unit 2604.

The Bayer image 2612 is an image containing a mixture of pixel values captured by the pixels under the different exposure conditions. The interpolation processing unit 2602 performs interpolation processing on the Bayer image 2612 to interpolate pixel positions where pixel data under the first exposure condition (S) that the total exposure enabling period is short are missing, to generate an interpolated image 2613, and to interpolate pixel positions where pixel data under the second exposure condition (L) that the total exposure enabling period is long are missing, to generate an interpolated image 2614. For example, by applying the low-pass filters (LPF) shown in FIGS. 22 and 23 to the Bayer image 2612, all-pixel interpolation can be performed (as above).

Further, the brightness detection unit 2603 detects the brightness value of a pixel of interest in the Bayer image 2612 after the gain processing. A pixel of interest is defined as desired. It may be a pixel in an area of note in generating an HDR image, or may be a pixel in a predetermined area such as the center of the image.

Then, the blend processing unit 2604 determines the blend ratio between the Bayer image 2612 after the gain processing and the interpolated images 2613 and 2614 on the basis of the brightness value detected by the brightness detection unit 2603, and blends these images 2612 to 2614 to output a Bayer image 2615 with a high dynamic range.

Here, blend processing performed by the blend processing unit 2604 will be described in more detail.

In terms of resolution, it is preferable to output the image 2612 subjected only to the gain processing without subjecting the image acquired under the two exposure conditions to the interpolation processing.

On the other hand, when the pixel of interest is short-time exposed, or when the image is too dark, the short-time exposed image has a lot of noise, thus resulting in an image failure. In such a case, it is desirable to select the interpolated image 2614 obtained by the long-time exposure even at the expense of resolution.

Figure 27:
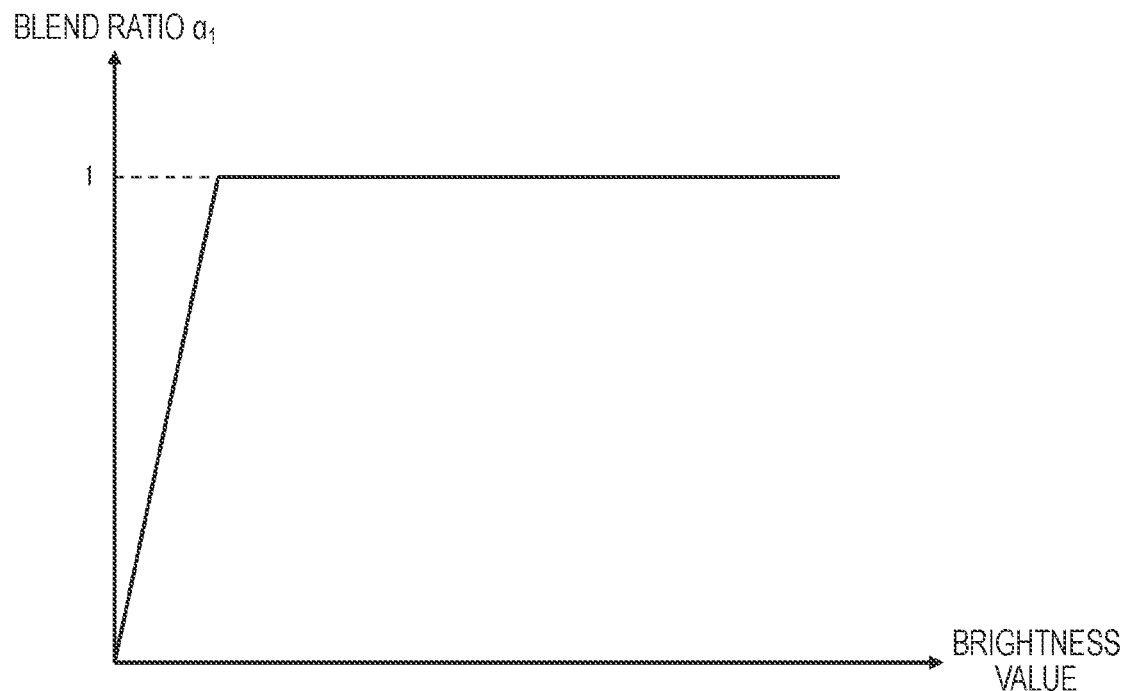
FIG. 27 is a diagram showing a blend ratio α1 when an HDR image at the position of a short-time exposed pixel is generated.

Thus, when an HDR image at the position (i, j) of a short-time exposed pixel is generated, a blend ratio $\alpha_1$ as shown in FIG. 27 is calculated, and the pixel value G(i, j) of the image 2612 after the gain processing and the pixel value L(i, j) of the long-time exposed interpolated image 2614 are blended at the blend ratio $\alpha_1$ as shown in Equation (2) below, to generate an HDR image.

[Equation 2]

$$(1-\alpha_1)\cdot G(i,j)+\alpha_1\cdot L(i,j) \quad (2)$$

In FIG. 27, in a low-brightness or dark place, the blend ratio $\alpha_1$ is zero, and the pixel value L(i, j) of the long-time exposed interpolated image 2614 is selected. Further, in a high-brightness or bright place, the blend ratio $\alpha_1$ is one, and the pixel value G(i, j) of the image 2612 after the gain processing is selected.

Furthermore, when the pixel of interest is long-time exposed, or when the image is too bright, long-time exposed pixels of the image 2612 after the gain processing are saturated, resulting in an image failure. In such a case, it is desirable to select the interpolated image 2613 obtained by the short-time exposure.

Figure 28:
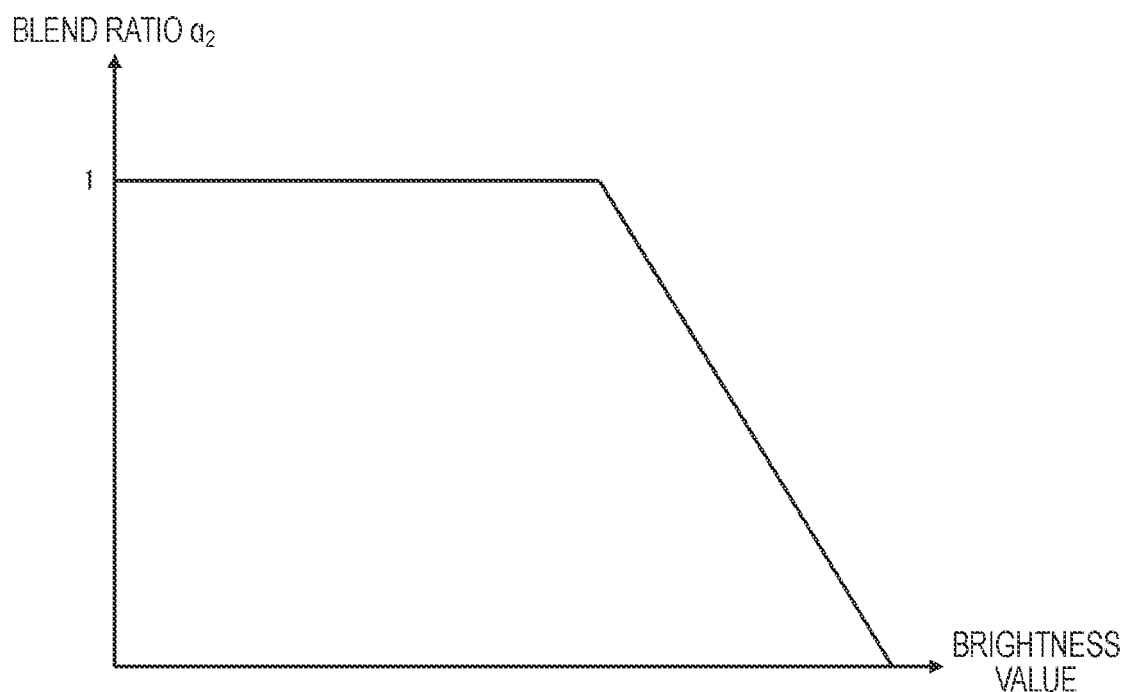
FIG. 28 is a diagram showing a blend ratio $\alpha_2$ when an HDR image at the position of a long-time exposed pixel is generated.

Thus, when an HDR image at the position (i, j) of a long-time exposed pixel is generated, a blend ratio $\alpha_2$ as shown in FIG. 28 is calculated, and the pixel value S(i, j) of the short-time exposed interpolated image 2613 and the pixel value G(i, j) of the image 2612 after the gain processing are blended at the blend ratio $\alpha_2$ as shown in Equation (3) below, to generate an HDR image.

[Equation 3]

$$(1-\alpha_2)\cdot S(i,j)+\alpha_2\cdot G(i,j) \quad (3)$$

In FIG. 28, in a low-brightness or dark place, the blend ratio $\alpha_2$ is one, and the pixel value G(i, j) of the image 2612 after the gain processing is selected. Further, in a high-brightness or bright place, the blend ratio $\alpha_2$ is zero, and the pixel value S(i, j) of the short-time exposed interpolated image 2613 is selected.

INDUSTRIAL APPLICABILITY

The technology disclosed in the present description has been described in detail above with reference to the specific embodiment. However, it is obvious that those skilled in the art can modify or substitute the embodiment without departing from the gist of the technology disclosed in the present description. That is, the technology disclosed in the present description has been described in the form of exemplification, and the contents described in the present description should not be construed as limiting. In order to determine the gist of the technology disclosed in the present description, the claims should be considered.

Note that the technology disclosed in the present description may have the following configurations.

(1) A signal processing apparatus that processes a control signal to control exposure timing in an image sensor including a mechanism to accumulate photoelectrically converted charge a plurality of times separately and then AD-convert and read out total charge, the signal processing apparatus including:

a first adjustment unit that adjusts exposure density in an exposure period;

a second adjustment unit that adjusts a start time and an end time of exposure in a frame period; and a generation unit that generates the control signal to control the exposure timing by the exposure density in the exposure period including the start time and the end time.

(2) The signal processing apparatus according to (1) above, in which the first adjustment unit includes a first counter that counts at small intervals, and a first timing generation unit that performs threshold processing on a count value of the first counter to generate a first exposure timing signal, the second adjustment unit includes a second counter that counts at large intervals, and a second timing generation unit that performs threshold processing on a count value of the second counter to generate a second exposure timing signal, and the generation unit takes a logical product of the first exposure timing signal and the second exposure timing signal to generate the control signal.

(3) The signal processing apparatus according to (1) or (2) above, further including:

a plurality of the generation units each including the first adjustment unit and the second adjustment unit, wherein a control signal including a different exposure period or exposure density generated by each of the plurality of generation units is provided to each pixel of the image sensor.

(4) The signal processing apparatus according to (3) above, in which the plurality of generation units includes at least a first generation unit that generates a first control signal with a short exposure enabling period, and a second generation unit that generates a second control signal with a long exposure enabling period.

(5) The signal processing apparatus according to (4) above, in which the control signals generated by the plurality of generation units are provided to the pixels of the image sensor so that pixels under different exposure conditions are arranged evenly in both a vertical direction and a horizontal direction of the image sensor.

(5-1) The signal processing apparatus according to (5) above, in which the first control signal and the second control signal are each provided to alternate pixels in each row of the image sensor so that pixels under a first exposure condition that the exposure enabling period is short and pixels under a second exposure condition that the exposure enabling period is long are arranged in a checkered pattern.

(6) The signal processing apparatus according to (4) above, in which the same control signal from the same generation unit is provided to each row of the image sensor, and different control signals from generation units different between rows are provided.

(6-1) The signal processing apparatus according to (6) above, in which the first control signal and the second control signal are each provide to alternate rows of the image sensor so that rows of pixels under a first exposure condition that the exposure enabling period is short and rows of pixels under a second exposure condition that the exposure enabling period is long are arranged alternately.

(7) The signal processing apparatus according to any one of (3) to (6) above, in which the plurality of generation units generates control signals each of which includes a different exposure density and any of which includes an exposure period that is an integral multiple of a flicker period.

(8) The signal processing apparatus according to any one of (3) to (7) above, in which the plurality of generation units generates respective control signals different from each other in exposure density in the same exposure period.

(9) The signal processing apparatus according to any one of (3) to (8) above, further including:

a gain processing unit that performs gain correction on pixel data on the basis of a ratio in exposure time between pixels.

(10) The signal processing apparatus according to (9) above, further including:

a difference calculation unit that calculates difference between corresponding pixels after the gain correction is performed, and detects change in brightness over time on the basis of difference information.

(11) The signal processing apparatus according to (10) above, further including:

a recording unit that accumulates an amount of difference calculated by the difference calculation unit for a predetermined time, in which flicker is detected on the basis of periodicity of the change in brightness.

(12) The signal processing apparatus according to (10) or (11) above, in which the plurality of generation units generates control signals that prevent occurrence of the detected flicker.

(12-1) The signal processing apparatus according to (12) above, in which each generation unit sets an exposure period that is an integral multiple of a flicker period, and adjusts the exposure density in the exposure period to provide an exposure enabling period satisfying an exposure condition.

(13) The signal processing apparatus according to (9) above, further including:

a brightness detection unit that detects brightness of a pixel of interest in a first image after the gain correction; and a blend processing unit that determines, on the basis of a result of detection in the brightness detection unit, a blend ratio between the first image and a second image captured under an exposure condition that an exposure enabling period is short or a third image captured under an exposure condition that an exposure enabling period is long, and blends the first image and the second image or the third image.

(14) The signal processing apparatus according to (13) above, in which the blend processing unit performs blend processing on the first image and the third image at a blend ratio according to a brightness value of each pixel when the pixel of interest is short-time exposed.

(14-1) The signal processing apparatus according to (14) above, in which the blend processing unit increases the blend ratio of the third image in a low-brightness pixel area for blend, and increases the blend ratio of the first pixel area in a high-brightness pixel area for blend.

(15) The signal processing apparatus according to (13) above, in which the blend processing unit performs blend processing on the first image and the second image at a blend ratio according to a brightness value of each pixel when the pixel of interest is long-time exposed.

(15-1) The signal processing apparatus according to (15) above, in which the blend processing unit increases the blend ratio of the first image in a low-brightness pixel area for blend, and increases the blend ratio of the second pixel area in a high-brightness pixel area for blend.

(16) A signal processing method that processes a control signal to control exposure timing in an image sensor including a mechanism to accumulate photoelectrically converted charge a plurality of times separately and then AD-convert and read out total charge, the signal processing method including:

a first adjustment step of adjusting exposure density in an exposure period;

a second adjustment step of adjusting a start time and an end time of exposure in a frame period; and a generation step of generating the control signal to control the exposure timing by the exposure density in the exposure period including the start time and the end time.

(17) An imaging device including:

an image sensor including a mechanism to accumulate photoelectrically converted charge a plurality of times separately and then AD-convert and read out total charge; and a controller that controls exposure timing in the image sensor, the controller including:

a first adjustment unit that adjusts exposure density in an exposure period;

a second adjustment unit that adjusts a start time and an end time of exposure in a frame period; and a generation unit that generates the control signal to control the exposure timing by the exposure density in the exposure period including the start time and the end time.

REFERENCE SIGNS LIST

100 Image sensor
101 controller
102 Vertical drive unit
103 Pixel array
104 Column signal processing unit
105 Signal processing unit
400 Unit pixel
401 Photodiode (PD)
402 First transfer gate (TRX)
403 Memory (MEM)
404 Second transfer gate (TRG)
405 Floating diffusion (FD)
700 Exposure timing generation unit
701 First counter
702 Second counter
703 First timing generation unit
704 Second timing generation unit
705 Timing integration unit
2000 Imaging device
2001 Lens optical system
2002 Image sensor
2003 Timing generation unit
2004 Camera signal processing unit
2101 Interpolation processing unit
2102 Gain processing unit
2103 Difference calculation unit
2601 Gain processing unit
2602 Interpolation processing unit
2603 Brightness detection unit
2604 Blend processing unit

The invention claimed is:

1. A signal processing apparatus, comprising:
a processor configured to:
process a control signal to control exposure timing in an image sensor that includes a mechanism to accumulate photoelectrically converted charge a plurality of times, AD-convert the accumulated charge, and read out the accumulated charge;
adjust exposure density in an exposure period;
count at first intervals to generate a first count value;
perform threshold processing operation on the first count value to generate a first exposure timing signal;
adjust a start time and an end time of exposure in a frame period;
count at second intervals to generate a second count value, wherein the second intervals are larger than the first intervals;
perform the threshold processing operation on the second count value to generate a second exposure timing signal;
take a logical product of the first exposure timing signal and the second exposure timing signal; and
generate, based on the logical product of the first exposure timing signal and the second exposure timing signal, the control signal to control the exposure timing, wherein
the exposure timing is controlled based on the exposure density in the exposure period, and
the exposure timing includes the start time and the end time.

2. The signal processing apparatus according to claim 1, wherein the processor is further configured to
generate a plurality of control signals, wherein each control signal of the plurality of control signals includes one of a different exposure period or a different exposure density for a respective pixel of a plurality of pixels of the image sensor.

3. The signal processing apparatus according to claim 2, wherein the plurality of control signals includes at least a first control signal with a short exposure enabling period, and a second control signal with a long exposure enabling period.

4. The signal processing apparatus according to claim 3, wherein the plurality of pixels under different exposure conditions is evenly present in both a vertical direction and a horizontal direction of the image sensor.

5. The signal processing apparatus according to claim 3, wherein
a first set of control signals of the plurality of control signals is associated with a row of a plurality of rows of the image sensor,
each control signal of the first set of control signals is same, and
a different control signal is associated with each row of the plurality of rows of the image sensor.

6. The signal processing apparatus according to claim 2, wherein
each control signal of the plurality of control signals includes a different exposure density, and
at least one control signal of the plurality of control signals includes an exposure period that is an integral multiple of a flicker period.

7. The signal processing apparatus according to claim 2, wherein the processor is further configured to generate the plurality of control signals different in the exposure density in the same exposure period.

8. The signal processing apparatus according to claim 2, wherein the processor is further configured to perform gain correction on pixel data based on a ratio in exposure time between the plurality of pixels.

9. The signal processing apparatus according to claim 8, wherein the processor is further configured to:
calculate a difference between corresponding pixels of the plurality of pixels after the gain correction; and detect a change in brightness over time based on difference information.

10. The signal processing apparatus according to claim 9, wherein
the processor is further configured to accumulate an amount of the calculated difference for a specific time, and
flicker is detected based on a periodicity of the change in the brightness.

11. The signal processing apparatus according to claim 10, wherein the plurality of control signals prevents occurrence of the detected flicker.

12. The signal processing apparatus according to claim 8, wherein the processor is further configured to:
detect brightness of a pixel of interest in a first image after the gain correction;
determine, based on a result of the detection of the brightness, a blend ratio between one of
the first image and a second image captured under an exposure condition that an exposure enabling period is short, or
the first image and a third image captured under an exposure condition that the exposure enabling period is long; and
blend the first image and one of the second image or the third image.

13. The signal processing apparatus according to claim 12, wherein the processor is further configured to perform blend processing operation on the first image and the third image at the blend ratio determined based on a brightness value of each pixel of the plurality of pixels when the pixel of interest is short-time exposed.

14. The signal processing apparatus according to claim 12, wherein
the processor is further configured to perform blend processing operation on the first image and the second image at the blend ratio determined based on a brightness value of each pixel of the plurality of pixels when the pixel of interest is long-time exposed.

15. A signal processing method, comprising:
processing a control signal to control exposure timing in an image sensor including a mechanism to accumulate photoelectrically converted charge a plurality of times, AD-convert the accumulated charge, and read out the accumulated charge;
adjusting exposure density in an exposure period;
counting at first intervals to generate a first count value;
performing threshold processing operation on the first count value to generate a first exposure timing signal;
adjusting a start time and an end time of exposure in a frame period;
counting at second intervals to generate a second count value, wherein the second intervals are larger than the first intervals;
performing the threshold processing operation on the second count value to generate a second exposure timing signal;
taking a logical product of the first exposure timing signal and the second exposure timing signal; and
generating, based on the logical product of the first exposure timing signal and the second exposure timing signal, the control signal to control the exposure timing, wherein
the exposure timing is controlled based on the exposure density in the exposure period, and
the exposure timing includes the start time and the end time.

16. An imaging device, comprising:
an image sensor that includes a mechanism configured to:
accumulate photoelectrically converted charge a plurality of times;
AD-convert the accumulated charge; and
read out the accumulated charge; and
a processor configured to:
control exposure timing in the image sensor;
adjust exposure density in an exposure period;
count at first intervals to generate a first count value;
perform threshold processing operation on the first count value to generate a first exposure timing signal;
adjust a start time and an end time of exposure in a frame period;
count at second intervals to generate a second count value, wherein the second intervals are larger than the first intervals;
perform the threshold processing operation on the second count value to generate a second exposure timing signal;
take a logical product of the first exposure timing signal and the second exposure timing signal; and
generate, based on the logical product of the first exposure timing signal and the second exposure timing signal, a control signal to control the exposure timing, wherein
the exposure timing is controlled based on the exposure density in the exposure period, and
the exposure timing includes the start time and the end time.

* * * * *